(12) United States Patent
Crabtree et al.

(10) Patent No.: US 10,560,483 B2
(45) Date of Patent: *Feb. 11, 2020

(54) RATING ORGANIZATION CYBERSECURITY USING ACTIVE AND PASSIVE EXTERNAL RECONNAISSANCE

(71) Applicant: Fractal Industries, Inc., Reston, VA (US)

(72) Inventors: Jason Crabtree, Vienna, VA (US); Andrew Sellers, Monument, CO (US)

(73) Assignee: QOMPLX, INC., Reston, VA (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/823,363

(22) Filed: Nov. 27, 2017

(65) Prior Publication Data

US 2018/0219919 A1    Aug. 2, 2018

Related U.S. Application Data

(63) Continuation-in-part of application No. 15/725,274, filed on Oct. 4, 2017, which is a continuation-in-part of application No. 15/655,113, filed on Jul. 20, 2017, which is a continuation-in-part of application No. 15/616,427, filed on Jun. 7, 2017, and a continuation-in-part of application No. 15/237,625, filed on Aug. 15, 2016, now Pat. No. 10,248,910, which is a continuation-in-part of application No. 15/206,195, filed on Jul. 8, 2016, which is a continuation-in-part of application No. 15/186,453, filed on Jun. 18, 2016, which is a continuation-in-part of application No. 15/166,158, filed on May 26, 2016, (Continued)

(51) Int. Cl.
*H04L 29/06* (2006.01)
*G06F 16/951* (2019.01)
*G06F 16/2458* (2019.01)

(52) U.S. Cl.
CPC .......... *H04L 63/20* (2013.01); *G06F 16/2477* (2019.01); *G06F 16/951* (2019.01); *H04L 63/1425* (2013.01); *H04L 63/1441* (2013.01)

(58) Field of Classification Search
CPC . H04L 63/20; H04L 63/1441; H04L 63/1425; G06F 16/2477; G06F 16/951
See application file for complete search history.

(56) References Cited

U.S. PATENT DOCUMENTS

| 6,256,544 B1 | 7/2001 | Weissinger |
| 2008/0010683 A1* | 1/2008 | Baddour ............ H04L 63/1441 726/24 |

(Continued)

FOREIGN PATENT DOCUMENTS

| WO | 2014159150 A1 | 10/2014 |
| WO | 2017075543 A1 | 5/2017 |

*Primary Examiner* — Cheng-Feng Huang
(74) *Attorney, Agent, or Firm* — Brian R. Galvin; Brian S. Boon; Galvin Patent Law LLC

(57) ABSTRACT

A system for cybersecurity rating using active and passive external reconnaissance, that uses a web crawler that sends message prompts to external hosts and receives responses from external hosts, a time-series data store that produces time-series data from the message responses, and a directed computational graph module that analyzes the time-series data to produce a weighted score representing the overall cybersecurity state of an organization.

2 Claims, 25 Drawing Sheets

Related U.S. Application Data which is a continuation-in-part of application No. 15/141,752, filed on Apr. 28, 2016, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015.

(56) References Cited

U.S. PATENT DOCUMENTS

| | | | |
|---|---|---|---|
| 2008/0133540 A1* | 6/2008 | Hubbard | H04L 63/101 |
| 2010/0281539 A1* | 11/2010 | Burns | H04L 63/1441 |
| | | | 726/23 |
| 2011/0283099 A1* | 11/2011 | Nath | H04L 9/008 |
| | | | 713/150 |
| 2012/0167162 A1* | 6/2012 | Raleigh | G06F 21/57 |
| | | | 726/1 |
| 2013/0304623 A1* | 11/2013 | Kumar | G06Q 40/04 |
| | | | 705/37 |
| 2015/0295766 A1* | 10/2015 | Dickey | H04L 41/0856 |
| | | | 709/221 |
| 2016/0028758 A1 | 1/2016 | Ellis et al. | |
| 2016/0127262 A1* | 5/2016 | Lawrence, III | G06F 16/951 |
| | | | 709/219 |
| 2016/0140519 A1* | 5/2016 | Trepca | G06Q 20/12 |
| | | | 705/26.44 |
| 2016/0275123 A1 | 9/2016 | Lin et al. | |
| 2017/0126712 A1 | 5/2017 | Crabtree et al. | |
| 2017/0139763 A1 | 5/2017 | Ellwein | |
| 2017/0149802 A1 | 5/2017 | Huang et al. | |

\* cited by examiner

Fig. 11    1100

RATING ORGANIZATION CYBERSECURITY USING ACTIVE AND PASSIVE EXTERNAL RECONNAISSANCE

CROSS-REFERENCE TO RELATED APPLICATIONS

This application is a continuation-in-part of Ser. No. 15/725,274, titled "APPLICATION OF ADVANCED CYBERSECURITY THREAT MITIGATION TO ROGUE DEVICES, PRIVILEGE ESCALATION, AND RISK-BASED VULNERABILITY AND PATCH MANAGEMENT", filed on Oct. 4, 2017, which is a continuation-in-part of U.S. patent application Ser. No. 15/655,113, titled "ADVANCED CYBERSECURITY THREAT MITIGATION USING BEHAVIORAL AND DEEP ANALYTICS", filed on Jul. 20, 2017, which is a continuation-in-part of U.S. patent application Ser. No. 15/616,427, titled "RAPID PREDICTIVE ANALYSIS OF VERY LARGE DATA SETS USING AN ACTOR-DRIVEN DISTRIBUTED COMPUTATIONAL GRAPH", filed on Jun. 7, 2017, and is also a continuation-in-part of U.S. patent application Ser. No. 15/237,625, titled "DETECTION MITIGATION AND REMEDIATION OF CYBERATTACKS EMPLOYING AN ADVANCED CYBER-DECISION PLATFORM", filed on Aug. 15, 2016, which is a continuation-in-part of U.S. patent application Ser. No. 15/206,195, titled "SYSTEM FOR AUTOMATED CAPTURE AND ANALYSIS OF BUSINESS INFORMATION FOR RELIABLE BUSINESS VENTURE OUTCOME PREDICTION", filed on Jul. 8, 2016, which is a continuation in-part of U.S. patent application Ser. No. 15/186,453, titled "SYSTEM FOR AUTOMATED CAPTURE AND ANALYSIS OF BUSINESS INFORMATION FOR RELIABLE BUSINESS VENTURE OUTCOME PREDICTION", filed on Jun. 18, 2016, which is a continuation-in-part of U.S. patent application Ser. No. 15/166,158, titled "SYSTEM FOR AUTOMATED CAPTURE AND ANALYSIS OF BUSINESS INFORMATION FOR SECURITY AND CLIENT-FACING INFRASTRUCTURE RELIABILITY", filed on May 26, 2016, which is a continuation-in-part of U.S. patent application Ser. No. 15/141,752, titled "SYSTEM FOR FULLY INTEGRATED CAPTURE, AND ANALYSIS OF BUSINESS INFORMATION RESULTING IN PREDICTIVE DECISION MAKING AND SIMULATION", filed on Apr. 28, 2016, which is a continuation-in-part of U.S. patent application Ser. No. 15/091,563, titled "SYSTEM FOR CAPTURE, ANALYSIS AND STORAGE OF TIME SERIES DATA FROM SENSORS WITH HETEROGENEOUS REPORT INTERVAL PROFILES", filed on Apr. 5, 2016, which is a continuation-in-part of U.S. patent application Ser. No. 14/986,536, titled "DISTRIBUTED SYSTEM FOR LARGE VOLUME DEEP WEB DATA EXTRACTION", filed on Dec. 31, 2015, which is a continuation-in-part of United States patent application 14/925,974, titled "RAPID PREDICTIVE ANALYSIS OF VERY LARGE DATA SETS USING THE DISTRIBUTED COMPUTATIONAL GRAPH", filed on Oct. 28, 2015, the entire specifications of each of which are incorporated herein by reference.

BACKGROUND OF THE INVENTION

Field of the Invention

The disclosure relates to the field of computer management, and more particularly to the field of cybersecurity and threat analytics.

Discussion of the State of the Art

IPv4 address space consists of $2^{32}$, or almost 4.3 billion possible IP addresses, which is within the giga-order of magnitude. Today's computers have CPUs with gigahertz clock rates and gigabytes of RAM and storage. Today's networks allow band-widths exceeding 1 gigabit per second. This makes iterations over the entire IPv4 space possible within a comparatively short time period. Today's port scanning software is able to perform massive port scans up to the complete IPv4 space within minutes. Once a device is connected to the Internet, it will be almost immediately scanned for open ports and services. Most of these scans are done by anonymous individuals, in particular targeting at finding and exploiting system vulnerabilities. However, there is also a variety of individuals and organizations openly practicing massive port scanning and pursuing different objectives.

What is needed is a system and method for performing active and passive external reconnaissance using network scanning, that feeds information into a distributed computational graph data pipeline to produce hybrid graph/time-series data for use in producing cybersecurity ratings for organizations.

SUMMARY OF THE INVENTION

Accordingly, the inventor has developed a system and method for rating organization cybersecurity using active and passive external reconnaissance.

The aspects described herein provide a system and methods for cybersecurity rating using active and passive external reconnaissance, comprising a web crawler that send message prompts to external hosts and receives responses from external hosts, a time-series data store that produces time-series data from the message responses, and a directed computational graph module that analyzes the time-series data to produce a weighted score representing the overall cybersecurity state of an organization.

According to one aspect, an advanced cyber decision platform for external network reconnaissance and cybersecurity rating, the platform comprising: a time-series data store comprising at least a processor, a memory, and a plurality of programming instructions stored in the memory and operating on the processor, wherein the programmable instructions, when operating on the processor, cause the processor to: receive a plurality of response messages from external hosts connected via a network; produce time-series data based on at least a portion of a received response message; a directed computational graph module comprising at least a processor, a memory, and a plurality of programming instructions stored in the memory and operating on the processor, wherein the programmable instructions, when operating on the processor, cause the processor to: perform a plurality of analysis and transformation operations on at least a portion of the time-series data; produce a weighted score based at least in part on the output of at least a portion of the analysis and transformation operations; a web crawler comprising at least a processor, a memory, and a plurality of programming instructions stored in the memory and operating on the processor, wherein the programmable instructions, when operating on the processor, cause the processor to: transmit a message prompt to an external host via a network; receive a message response from the external host; and provide at least a portion of the message response to the time-series data store, is disclosed.

According to another aspect, a method for external network reconnaissance and cybersecurity rating, comprising the steps of: a) transmitting, using a web crawler, a plurality of message prompts to a plurality of external hosts via a network; b) receiving at least a message response from an external host; c) producing, using a time-series data store, time-series data based at least in part on at least a portion of the received message response; d) performing, using a directed computational graph module, a plurality of analysis and transformation operations on at least a portion of the time-series data; and e) producing a weighted score based at least in part on the output of at least a portion of the analysis and transformation operations, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
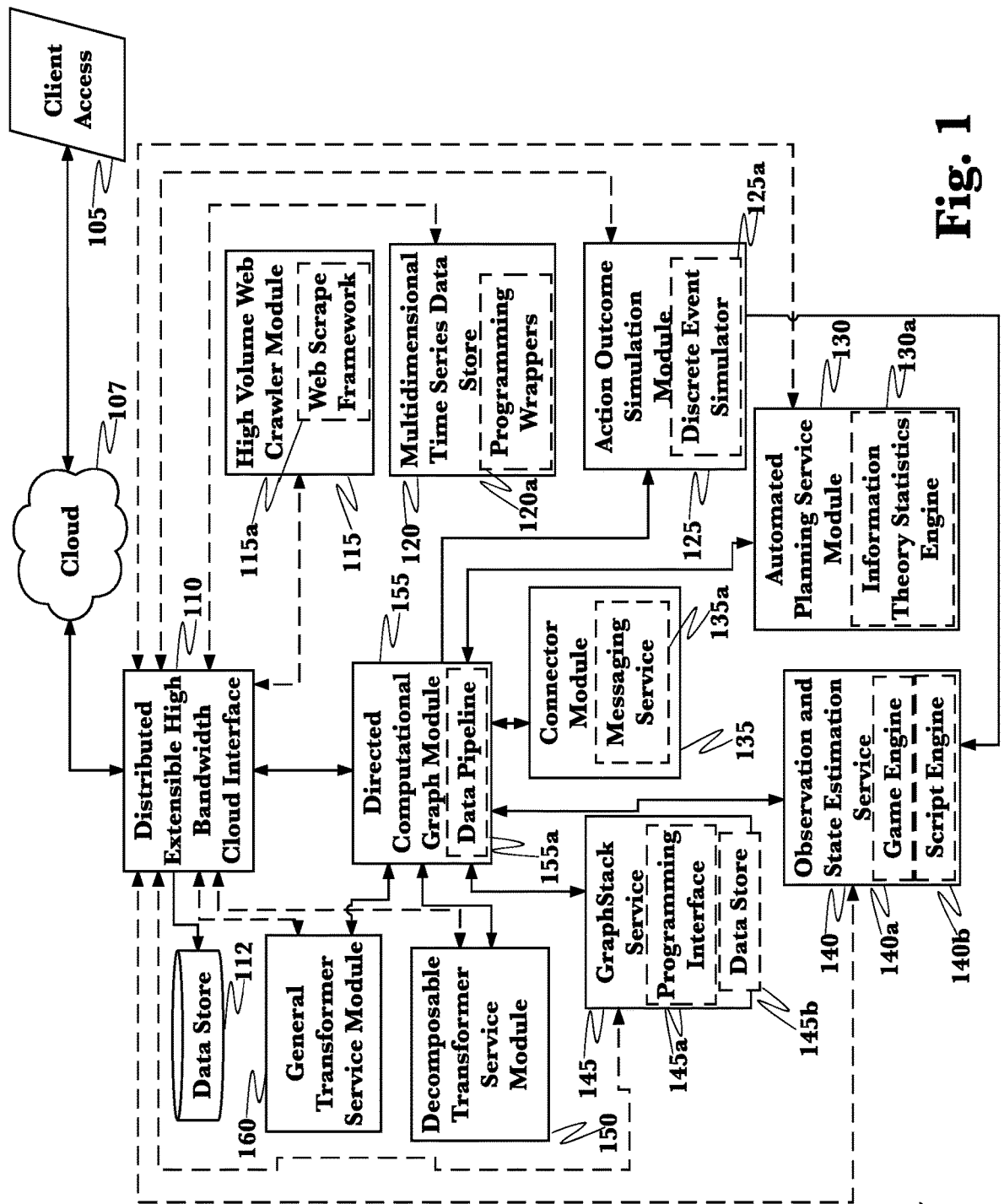
FIG. 1 is a block diagram of an exemplary system architecture for an advanced cyber decision platform for external network reconnaissance and cybersecurity rating.

The inventor has conceived, and reduced to practice, a system and method for rating organization cybersecurity using active and passive external reconnaissance.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "graph" is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall", "DOB Aug. 13, 1965" and "speaks English". Similar to the use of properties to further describe the information in a node, a relationship between two nodes that forms an edge can be qualified using a "label". Thus, given a second node "Thomas G," an edge between "James R" and "Thomas G" that indicates that the two people know each other might be labeled "knows." When graph theory notation (Graph= (Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected." Under circumstances when a relationship flows from one node to another in one direction, for example James R is "taller" than Thomas G, the order of the endpoints is significant. Graphs with such edges are designated as "directed." In the distributed computational graph system, transformations within transformation pipeline are represented as directed graph with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that transformation graph may assume many shapes and sizes with a vast topography of edge relationships. The examples given were chosen for illustrative purposes only and represent a small number of the simplest of possibilities. These examples should not be taken to define the possible graphs expected as part of operation of the invention As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as a example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "database" or "data storage subsystem" (these terms may be considered substantially synonymous), as used herein, is a system adapted for the long-term storage, indexing, and retrieval of data, the retrieval typically being via some sort of querying interface or language. "Database"

may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various aspects may preferentially employ one or another of the various data storage subsystems available in the art (or available in the future), the invention should not be construed to be so limited, as any data storage architecture may be used according to the aspects. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

A "data context", as used herein, refers to a set of arguments identifying the location of data. This could be a Rabbit queue, a .csv file in cloud-based storage, or any other such location reference except a single event or record. Activities may pass either events or data contexts to each other for processing. The nature of a pipeline allows for direct information passing between activities, and data locations or files do not need to be predetermined at pipeline start.

A "pipeline", as used herein and interchangeably referred to as a "data pipeline" or a "processing pipeline", refers to a set of data streaming activities and batch activities. Streaming and batch activities can be connected indiscriminately within a pipeline. Events will flow through the streaming activity actors in a reactive way. At the junction of a streaming activity to batch activity, there will exist a StreamBatchProtocol data object. This object is responsible for determining when and if the batch process is run. One or more of three possibilities can be used for processing triggers: regular timing interval, every N events, or optionally an external trigger. The events are held in a queue or similar until processing. Each batch activity may contain a "source" data context (this may be a streaming context if the upstream activities are streaming), and a "destination" data context (which is passed to the next activity). Streaming activities may have an optional "destination" streaming data context (optional meaning: caching/persistence of events vs. ephemeral), though this should not be part of the initial implementation.

Conceptual Architecture

FIG. 1 is a block diagram of an advanced cyber decision platform for external network reconnaissance and cybersecurity rating. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information via network 107 and operates a data store 112 such as, but not limited to MONGODB™, COUCHDB™, CASSANDRA™ or REDIS™ according to various arrangements. Much of the business data analyzed by the system both from sources within the confines of the client business, and from cloud based sources, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database (MDTSDB) 120 and the graph stack service 145. The directed computational graph module 155 retrieves one or more streams of data from a plurality of sources, which includes, but is in no way not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to enterprise network usage data, component and system logs, performance data, network service information captures such as, but not limited to news and financial feeds, and sales and service related customer data. The module is designed to accommodate irregular and high volume surges by dynamically allotting network bandwidth and server processing channels to process the incoming data. Inclusion of programming wrappers 120a for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database (MDTSDB) 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data.

When performing external reconnaissance via a network 107, web crawler 115 may be used to perform a variety of port and service scanning operations on a plurality of hosts. This may be used to target individual network hosts (for example, to examine a specific server or client device) or to broadly scan any number of hosts (such as all hosts within a particular domain, or any number of hosts up to the complete IPv4 address space). Port scanning is primarily used for gathering information about hosts and services connected to a network, using probe messages sent to hosts that prompt a response from that host. Port scanning is generally centered around the transmission control protocol (TCP), and using the information provided in a prompted response a port scan can provide information about network and application layers on the targeted host.

Port scan results can yield information on open, closed, or undetermined ports on a target host. An open port indicated that an application or service is accepting connections on this port (such as ports used for receiving customer web traffic on a web server), and these ports generally disclose the greatest quantity of useful information about the host. A closed port indicates that no application or service is listening for connections on that port, and still provides information about the host such as revealing the operating system of the host, which may discovered by fingerprinting the TCP/IP stack in a response. Different operating systems exhibit identifiable behaviors when populating TCP fields, and collecting multiple responses and matching the fields against a database of known fingerprints makes it possible to determine the OS of the host even when no ports are open. An undetermined port is one that does not produce a requested response, generally because the port is being filtered by a firewall on the host or between the host and the network (for example, a corporate firewall behind which all internal servers operate).

Scanning may be defined by scope to limit the scan according to two dimensions, hosts and ports. A horizontal scan checks the same port on multiple hosts, often used by attackers to check for an open port on any available hosts to select a target for an attack that exploits a vulnerability using that port. This type of scan is also useful for security audits, to ensure that vulnerabilities are not exposed on any of the target hosts. A vertical scan defines multiple ports to examine on a single host, for example a "vanilla scan" which targets every port of a single host, or a "strobe scan" that targets a small subset of ports on the host. This type of scan is usually performed for vulnerability detection on single systems, and due to the single-host nature is impractical for large network scans. A block scan combines elements of both horizontal and vertical scanning, to scan multiple ports on multiple hosts. This type of scan is useful for a variety of service discovery and data collection tasks, as it allows a broad scan of many hosts (up to the entire Internet, using the complete IPv4 address space) for a number of desired ports in a single sweep.

Large port scans involve quantitative research, and as such may be treated as experimental scientific measurement and are subject to measurement and quality standards to ensure the usefulness of results. To avoid observational errors during measurement, results must be precise (describing a degree of relative proximity between individual measured values), accurate (describing relative proximity of measured values to a reference value), preserve any metadata that accompanies the measured data, avoid misinterpretation of data due to faulty measurement execution, and must be well-calibrated to efficiently expose and address issues of inaccuracy or misinterpretation. In addition to these basic requirements, large volumes of data may lead to unexpected behavior of analysis tools, and extracting a subset to perform initial analysis may help to provide an initial overview before working with the complete data set. Analysis should also be reproducible, as with all experimental science, and should incorporate publicly-available data to add value to the comprehensibility of the research as well as contributing to a "common framework" that may be used to confirm results.

When performing a port scan, web crawler 115 may employ a variety of software suitable for the task, such as Nmap, ZMap, or masscan. Nmap is suitable for large scans as well as scanning individual hosts, and excels in offering a variety of diverse scanning techniques. ZMap is a newer application and unlike Nmap (which is more general-purpose), ZMap is designed specifically with Internet-wide scans as the intent. As a result, ZMap is far less customizable and relies on horizontal port scans for functionality, achieving fast scan times using techniques of probe randomization (randomizing the order in which probes are sent to hosts, minimizing network saturation) and asynchronous design (utilizing stateless operation to send and receive packets in separate processing threads). Masscan uses the same asynchronous operation model of ZMap, as well as probe randomization. In masscan however, a certain degree of statistical randomness is sacrificed to improve computation time for large scans (such as when scanning the entire IPv4 address space), using the BlackRock algorithm. This is a modified implementation of symmetric encryption algorithm DES, with fewer rounds and modulo operations in place of binary ones to allow for arbitrary ranges and achieve faster computation time for large data sets.

Received scan responses may be collected and processed through a plurality of data pipelines 155a to analyze the collected information. MDTSDB 120 and graph stack 145 may be used to produce a hybrid graph/time-series database using the analyzed data, forming a graph of Internet-accessible organization resources and their evolving state information over time. Customer-specific profiling and scanning information may be linked to CPG graphs (as described below in detail, referring to FIG. 11) for a particular customer, but this information may be further linked to the base-level graph of internet-accessible resources and information. Depending on customer authorizations and legal or regulatory restrictions and authorizations, techniques used may involve both passive, semi-passive and active scanning and reconnaissance.

Figure 2A:
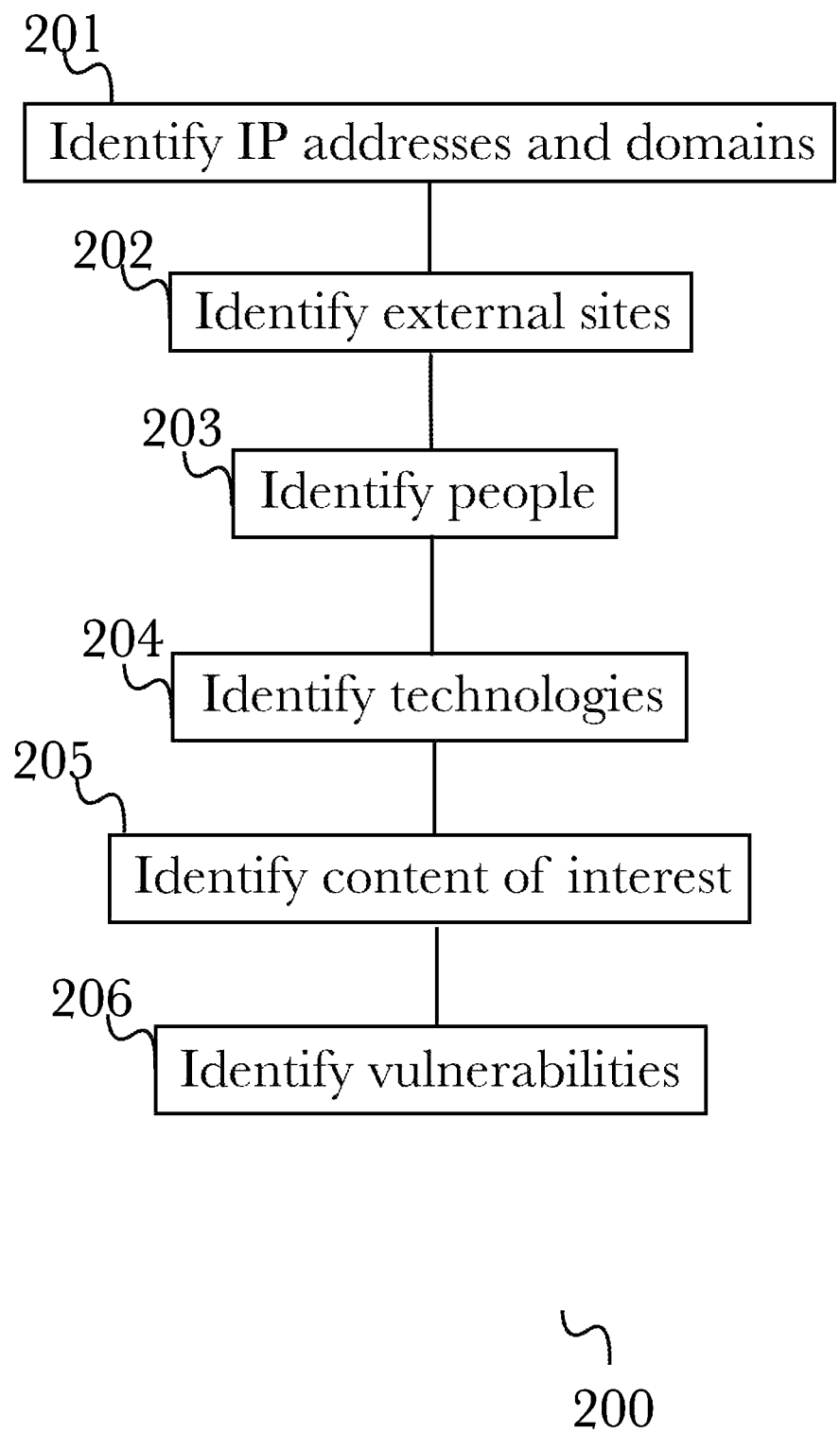
FIG. 2A is a block diagram showing general steps for performing passive network reconnaissance.

FIG. 2A is a block diagram showing general steps 200 for performing passive network reconnaissance. It should be appreciated that the steps illustrated and described may be performed in any order, and that steps may be added or omitted as needed for any particular reconnaissance operation. In a step 201, network address ranges and domains or sub-domains associated with a plurality of targets may be identified, for example to collect information for defining the scope of further scanning operations. In another step 202, external sites may be identified to understand relationships between targets and other third-party content providers, such as trust relationships or authoritative domain name service (DNS) resolution records. In another step 203, individual people or groups may be identified using names, email addresses, phone numbers, or other identifying information that may be useful for a variety of social engineering activities. In another step 204, technologies used may be identified, such as types or versions of hardware or software used by an organization, and this may include collecting and extracting information from job descriptions (for example) to identify technologies in use by an organization (for example, a job description for an administrator familiar with specific database software indicates that said software is in use within the organization). In another step 205, content of interest may be identified, for example including web and email portals, log files, backup or archive files, and other forms of sensitive information that may be contained within HTML comments or client-side scripts, as may be useful for vulnerability discovery and penetration testing activities. In another step 206, publicly-available information may be used to identify vulnerabilities that may be exploited with further active penetration testing.

Figure 2B:
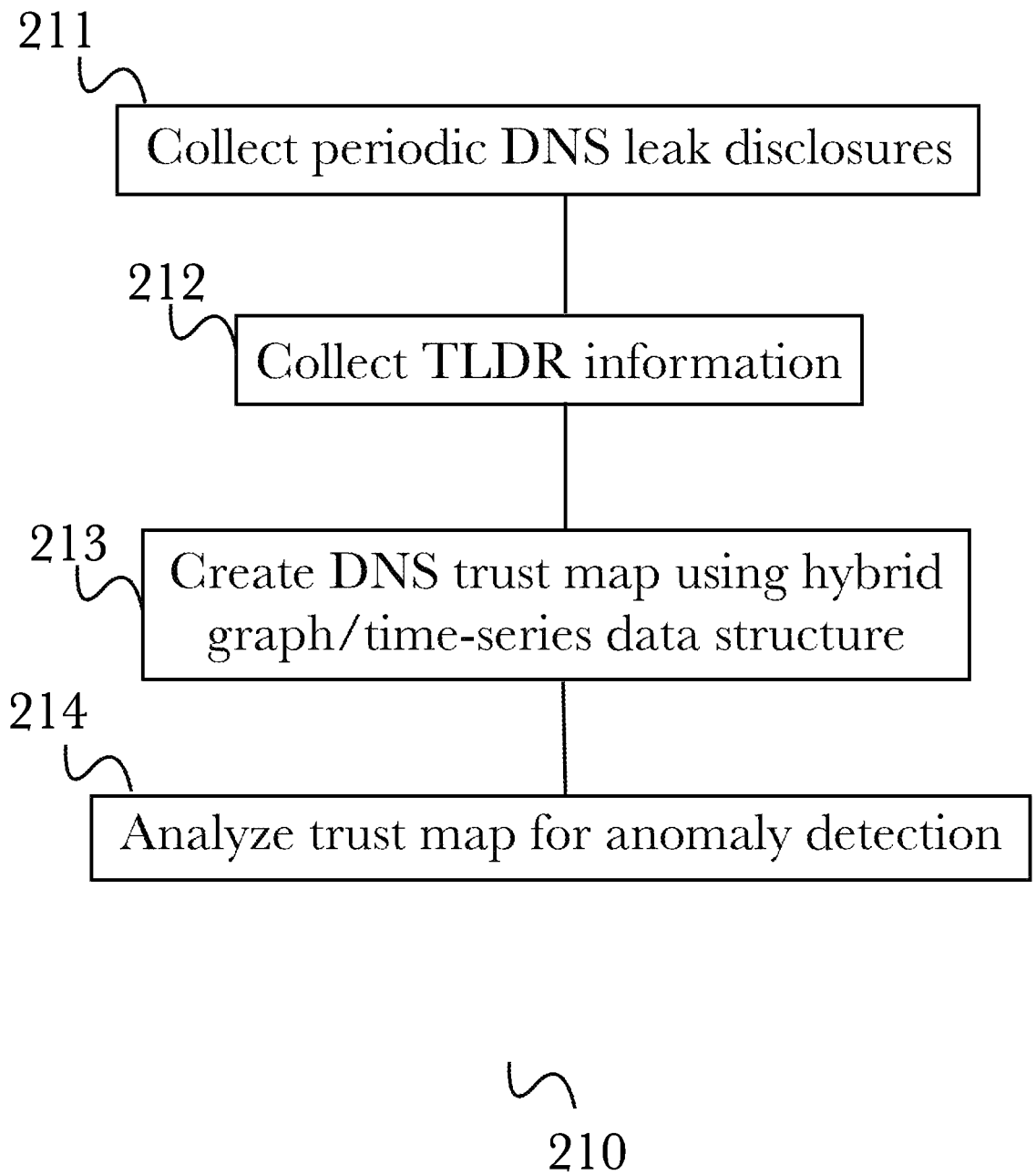
FIG. 2B is a process diagram showing a general flow of a process for performing active reconnaissance using DNS leak information collection.

FIG. 2B is a process diagram showing a general flow of a process 210 for performing active reconnaissance using DNS leak information collection. In an initial step 211, publicly-available DNS leak disclosure information may be collected to maintain current information regarding known leaks and vulnerabilities. In a next step 212, third-level domain (TLDR) information may be collected and used to report domain risk factors, such as domains that do not resolve properly (due to malformed DNS records, for example). In a next step 213, a DNS trust map may be created using a hybrid graph/time-series data structure, using a graph stack service 145 and MDTSDB 120. This trust map may be produced as the output of an extraction process performed by a DCG 155 through a plurality of data pipelines 155a, analyzing collected data and mapping data points to produce hybrid structured output representing each data point over time. In a final step 214, the trust map may then be analyzed to identify anomalies, for example using community detection algorithms that may discover when new references are being created, and this may be used to identify vulnerabilities that may arise as a byproduct of the referential nature of a DNS hierarchy. In this manner, DCG pipeline processing and time-series data graphing may be used to identify vulnerabilities that would otherwise be obscured within a large dataset.

Figure 2C:
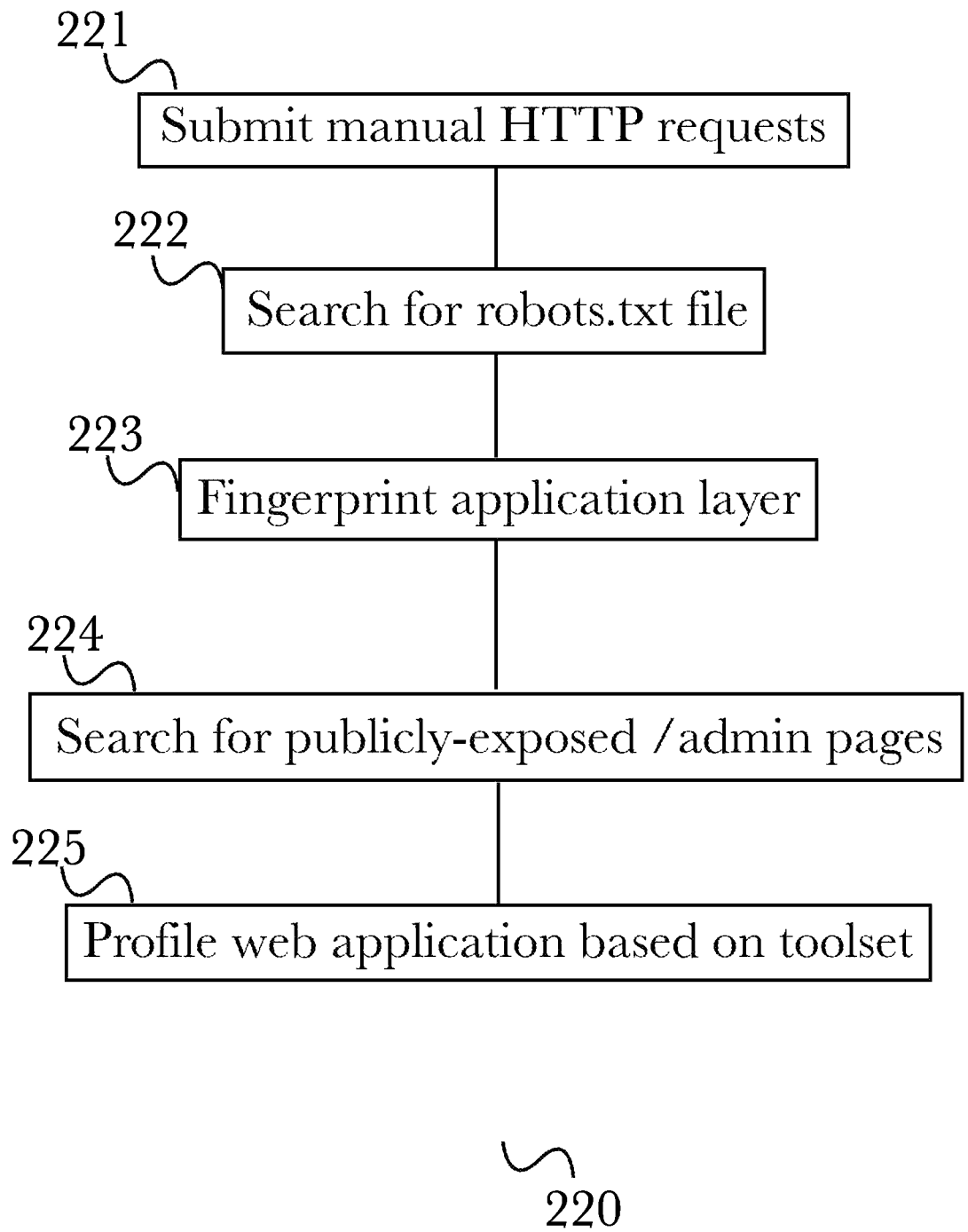
FIG. 2C is a process diagram showing a general flow of a process for performing active reconnaissance using web application and technology reconnaissance.

FIG. 2C is a process diagram showing a general flow of a process 220 for performing active reconnaissance using web application and technology reconnaissance. In an initial step 221, a plurality of manual HTTP requests may be transmitted to a host, for example to determine if a web server is announcing itself, or to obtain an application version number from an HTTP response message. In a next step 222, a robots.txt used to identify and communicate with web crawlers and other automated "bots", may be searched for to identify portions of an application or site that robots are requested to ignore. In a next step 223, the host application layer may be fingerprinted, for example using file extensions and response message fields to identify characteristic patterns or markers that may be used to identify host or application details. In a next step 224, publicly-exposed admin pages may be checked, to determine if any administrative portals are exposed and therefore potentially-vulnerable, as well as to potentially determine administration policies or capabilities based on exposed information. In a final step 225, an application may be profiled according to a particular toolset in use, such as WORDPRESS™ (for example) or other specific tools or plugins.

Figure 2D:
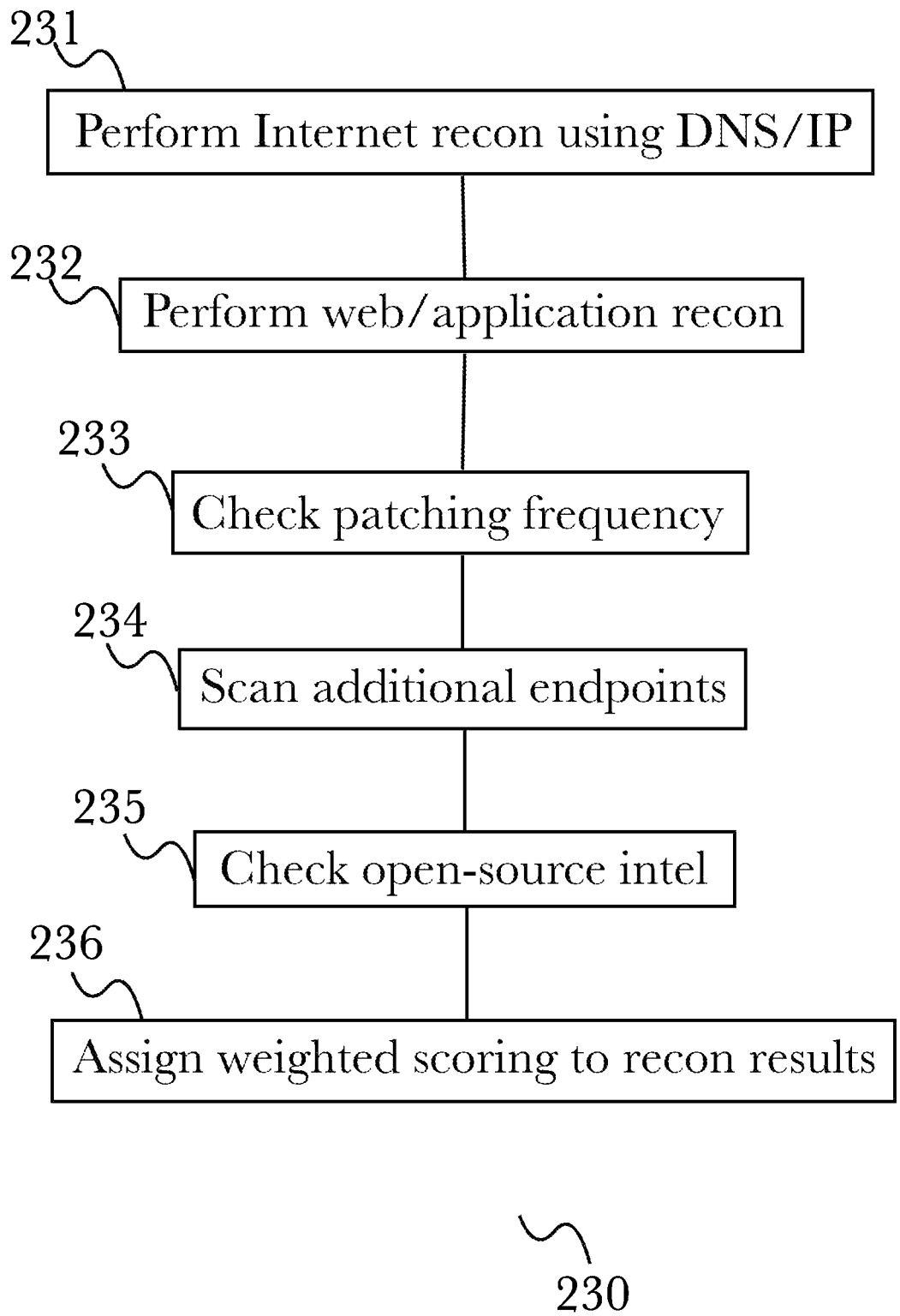
FIG. 2D is a process diagram showing a general flow of a process for producing a cybersecurity rating using reconnaissance data.

FIG. 2D is a process diagram showing a general flow of a process 230 for producing a cybersecurity rating using reconnaissance data. In an initial step 231, external reconnaissance may be performed using DNS and IP information as described above (referring to FIG. 2B), collecting information from DNS records, leak announcements, and publicly-available records to produce a DNS trust map from collected information and the DCG-driven analysis thereof. In a next step 232, web and application recon may be performed (as described in FIG. 2C), collecting information on applications, sites, and publicly-available records. In a next step 233, collected information over time may be analyzed for software version numbers, revealing the patching frequency of target hosts and their respective applications and services. Using a hybrid time-series graph, timestamps may be associated with ongoing changes to reveal these updates over time. In a next step 234, a plurality of additional endpoints may be scanned, such as (for example, including but not limited to) internet-of-things (IoT) devices that may be scanned and fingerprinted, end-user devices such as personal smartphones, tablets, or computers, or social network endpoints such as scraping content from user social media pages or feeds. User devices may be fingerprinted and analyzed similar to organization hosts, and social media content may be retrieved such as collecting sentiment from services like TWITTER™ or LINKEDIN™, or analyzing job description listings and other publicly-available information. In a next step 235, open-source intelligence feeds may be checked, such as company IP address blacklists, search domains, or information leaks (for example, posted to public records such as PASTEBIN™). In a final step 236, collected information from all sources may be scored according to a weighted system, producing an overall cybersecurity rating score based on the information collected and the analysis of that information to reveal additional insights, relationships, and vulnerabilities.

For example, in an exemplary scoring system similar to a credit rating, information from initial Internet recon operations may be assigned a score up to 400 points, along with up to 200 additional points for web/application recon results, 100 points for patch frequency, and 50 points each for additional endpoints and open-source intel results. This yields a weighted score incorporating all available information from all scanned sources, allowing a meaningful and readily-appreciable representation of an organization's overall cybersecurity strength. Additionally, as scanning may be performed repeatedly and results collected into a time-series hybrid data structure, this cybersecurity rating may evolve over time to continuously reflect the current state of the organization, reflecting any recent changes, newly-discovered or announced vulnerabilities, software or hardware updates, newly-added or removed devices or services, and any other changes that may occur.

Figure 3:
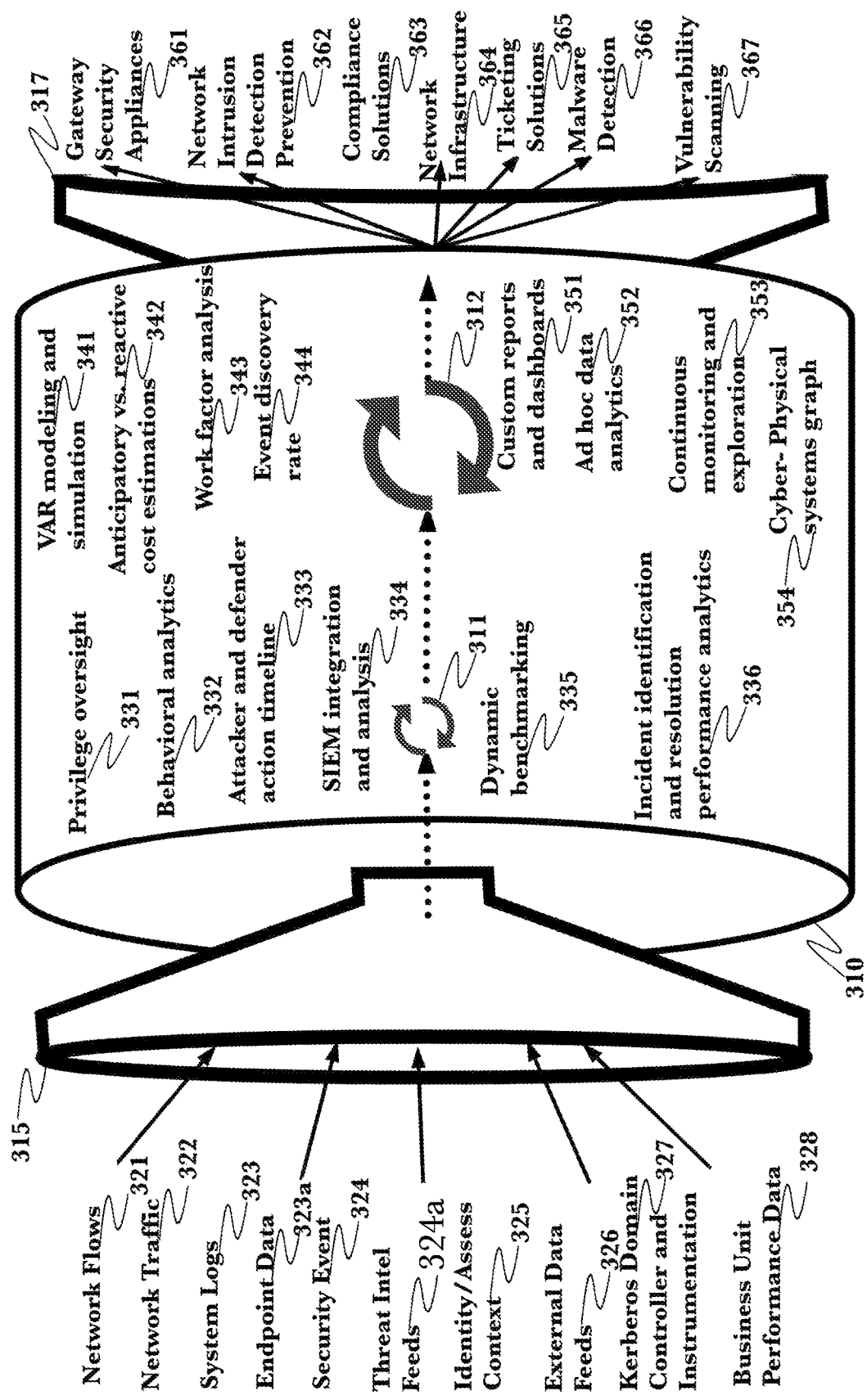
FIG. 3 is a process diagram showing business operating system functions in use to mitigate cyberattacks.

FIG. 3 is a process diagram showing a general flow 300 of business operating system functions in use to mitigate cyberattacks. Input network data which may include network flow patterns 321, the origin and destination of each piece of measurable network traffic 322, system logs from servers and workstations on the network 323, endpoint data 323a, any security event log data from servers or available security information and event (SIEM) systems 324, external threat intelligence feeds 324a, identity or assessment context 325, external network health or cybersecurity feeds 326, Kerberos domain controller or ACTIVE DIRECTORY™ server logs or instrumentation 327 and business unit performance related data 328, among many other possible data types for which the invention was designed to analyze and integrate, may pass into 315 the business operating system 310 for analysis as part of its cyber security function. These multiple types of data from a plurality of sources may be transformed for analysis 311, 312 using at least one of the specialized cybersecurity, risk assessment or common functions of the business operating system in the role of cybersecurity system, such as, but not limited to network and system user privilege oversight 331, network and system user behavior analytics 332, attacker and defender action timeline 333, SIEM integration and analysis 334, dynamic benchmarking 335, and incident identification and resolution performance analytics 336 among other possible cybersecurity functions; value at risk (VAR) modeling and simulation 341, anticipatory vs. reactive cost estimations of different types of data breaches to establish priorities 342, work factor analysis 343 and cyber event discovery rate 344 as part of the system's risk analytics capabilities; and the ability to format and deliver customized reports and dashboards 351, perform generalized, ad hoc data analytics on demand 352, continuously monitor, process and explore incoming data for subtle changes or diffuse informational threads 353 and generate cyber-physical systems graphing 354 as part of the business operating system's common capabilities. Output 317 can be used to configure network gateway security appliances 361, to assist in preventing network intrusion through predictive change to infrastructure recommendations 362, to alert an enterprise of ongoing cyberattack early in the attack cycle, possibly thwarting it but at least mitigating the damage 362, to record compliance to standardized guidelines or SLA requirements 363, to continuously probe existing network infrastructure and issue alerts to any changes which may make a breach more likely 364, suggest solutions to any domain controller ticketing weaknesses detected 365, detect presence of malware 366, and perform one time or continuous vulnerability scanning depending on client directives 367. These examples are, of course, only a subset of the possible uses of the system, they are exemplary in nature and do not reflect any boundaries in the capabilities of the invention.

Figure 4:
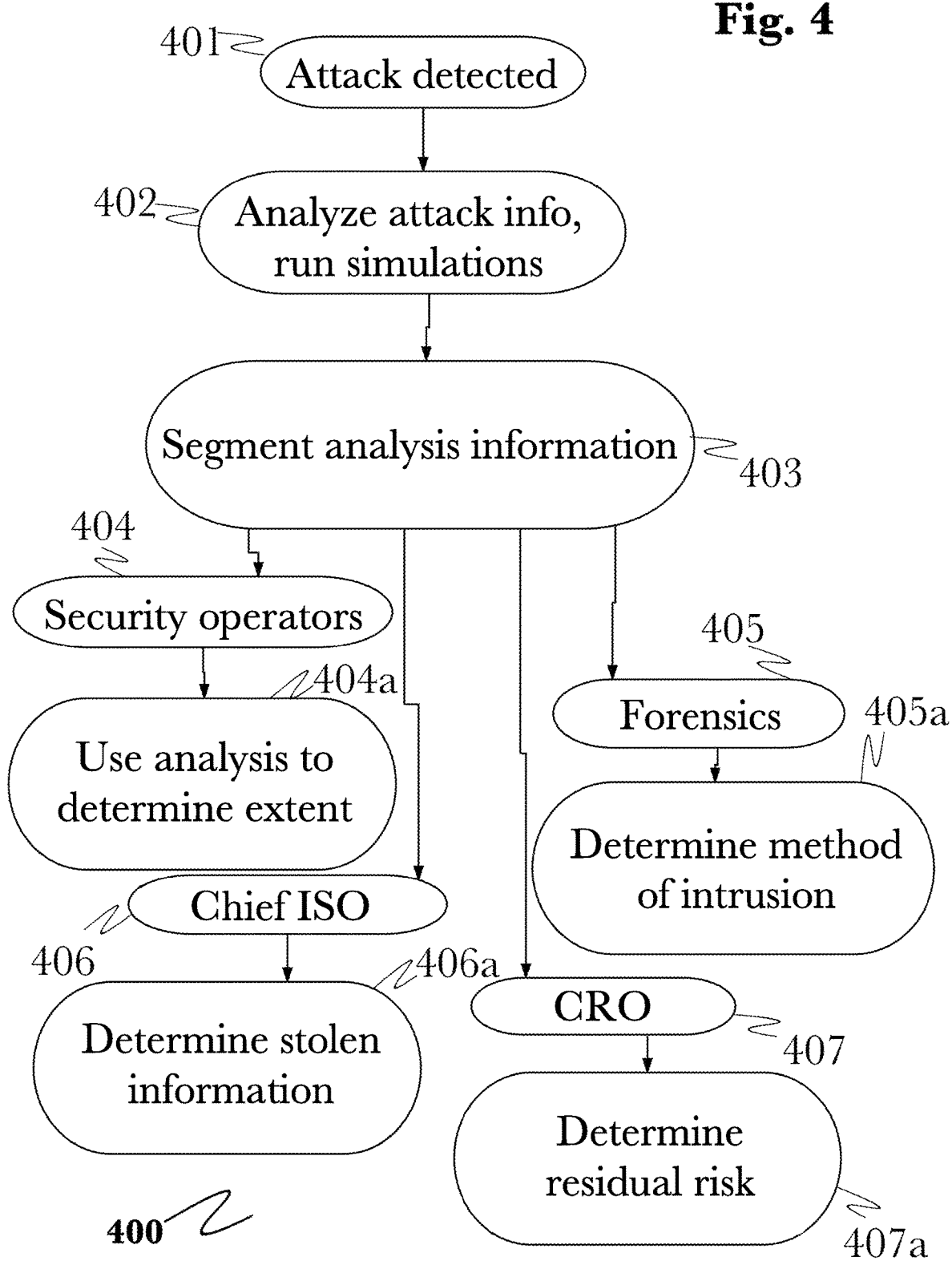
FIG. 4 is a process flow diagram of a method for segmenting cyberattack information to appropriate corporation parties.

FIG. 4 is a process flow diagram of a method for segmenting cyberattack information to appropriate corporation parties 400. As previously disclosed 200, 351, one of the strengths of the advanced cyber-decision platform is the ability to finely customize reports and dashboards to specific audiences, concurrently is appropriate. This customization is possible due to the devotion of a portion of the business operating system's programming specifically to outcome presentation by modules which include the observation and state estimation service 140 with its game engine 140a and script interpreter 140b. In the setting of cybersecurity, issuance of specialized alerts, updates and reports may significantly assist in getting the correct mitigating actions done in the most timely fashion while keeping all participants informed at predesignated, appropriate granularity. Upon the detection of a cyberattack by the system 401 all available information about the ongoing attack and existing cybersecurity knowledge are analyzed, including through predictive simulation in near real time 402 to develop both the most accurate appraisal of current events and actionable recommendations concerning where the attack may progress and how it may be mitigated. The information generated in totality is often more than any one group needs to perform their mitigation tasks. At this point, during a cyberattack, providing a single expansive and all inclusive alert, dashboard image, or report may make identification and action upon the crucial information by each participant more difficult, therefore the cybersecurity focused arrangement may create multiple targeted information streams each concurrently designed to produce most rapid and efficacious action throughout the enterprise during the attack and issue follow-up reports with and recommendations or information that may lead to long term changes afterward 403. Examples of groups that may receive specialized information streams include but may not be limited to front line responders during the attack 404, incident forensics support both during and after the attack 405, chief information security officer 406 and chief risk officer 407 the information sent to the latter two focused to appraise overall damage and to implement both mitigating strategy and preventive changes after the attack. Front line responders may use the cyber-decision platform's analyzed, transformed and correlated information specifically sent to them 404a to probe the extent of the attack, isolate such things as: the predictive attacker's entry point onto the enterprise's network, the systems involved or the predictive ultimate targets of the attack and may use the simulation capabilities of the system to investigate alternate methods of successfully ending the attack and repelling the attackers in the most efficient manner, although many other queries known to those skilled in the art are also answerable by the invention. Simulations run may also include the predictive effects of any attack mitigating actions on normal and critical operation of the enterprise's IT systems and corporate users. Similarly, a chief information security officer may use the cyber-decision platform to predictively analyze 406a what corporate information has already been compromised, predictively simulate the ultimate information targets of the attack that may or may not have been compromised and the total impact of the attack what can be done now and in the near future to safeguard that information. Further, during retrospective forensic inspection of the attack, the forensic responder may use the cyber-decision platform 405*a* to clearly and completely map the extent of network infrastructure through predictive simulation and large volume data analysis. The forensic analyst may also use the platform's capabilities to perform a time series and infrastructural spatial analysis of the attack's progression with methods used to infiltrate the enterprise's subnets and servers. Again, the chief risk officer would perform analyses of what information 407*a* was stolen and predictive simulations on what the theft means to the enterprise as time progresses. Additionally, the system's predictive capabilities may be employed to assist in creation of a plan for changes of the IT infrastructural that should be made that are optimal for remediation of cybersecurity risk under possibly limited enterprise budgetary constraints in place at the company so as to maximize financial outcome.

Figure 5:
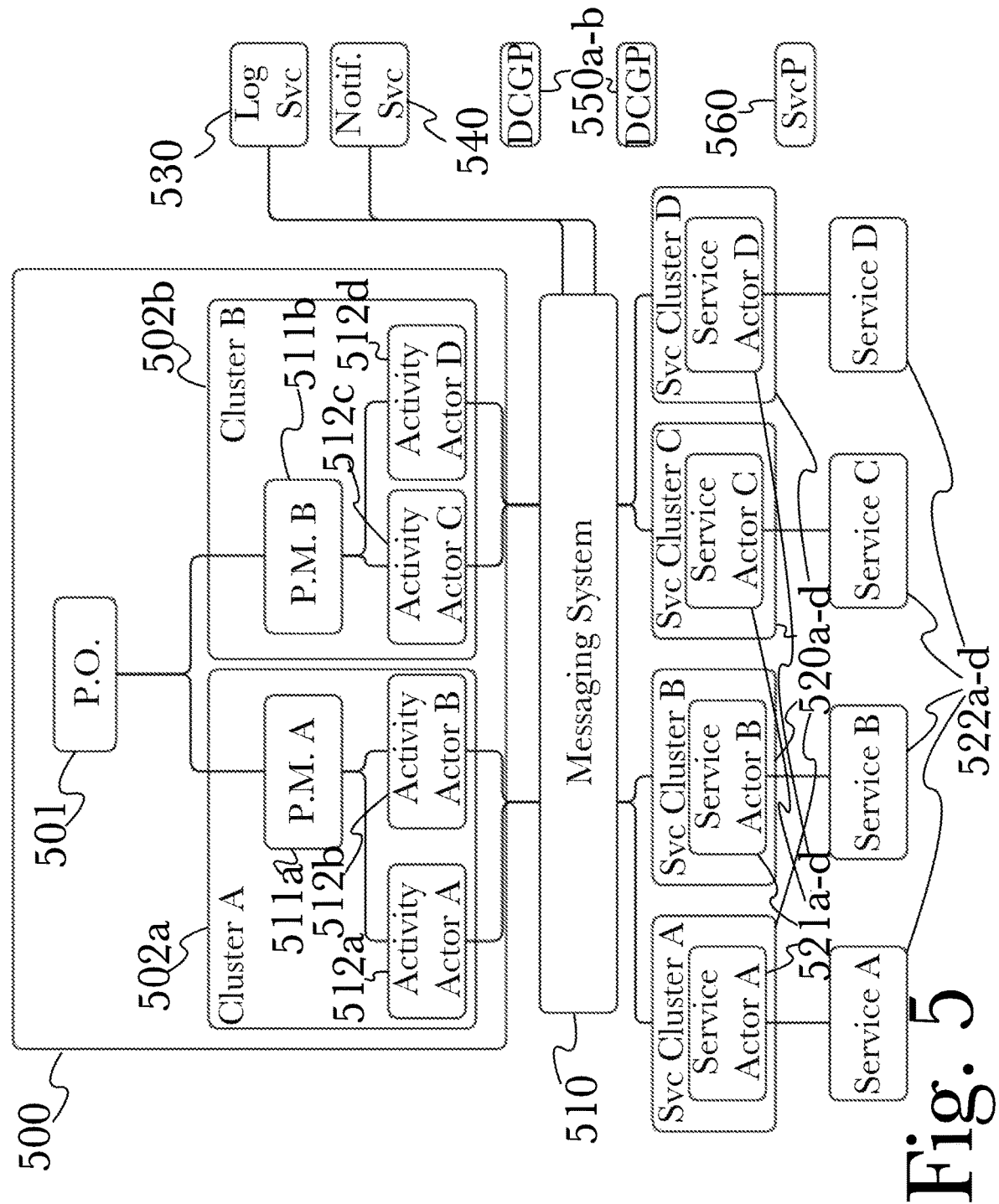
FIG. 5 is a diagram of an exemplary architecture for a system for rapid predictive analysis of very large data sets using an actor-driven distributed computational graph, according to one aspect.

FIG. 5 is a diagram of an exemplary architecture for a system for rapid predictive analysis of very large data sets using an actor-driven distributed computational graph 500, according to one aspect. According to the aspect, a DCG 500 may comprise a pipeline orchestrator 501 that may be used to perform a variety of data transformation functions on data within a processing pipeline, and may be used with a messaging system 510 that enables communication with any number of various services and protocols, relaying messages and translating them as needed into protocol-specific API system calls for interoperability with external systems (rather than requiring a particular protocol or service to be integrated into a DCG 500).

Pipeline orchestrator 501 may spawn a plurality of child pipeline clusters 502*a-b*, which may be used as dedicated workers for streamlining parallel processing. In some arrangements, an entire data processing pipeline may be passed to a child cluster 502*a* for handling, rather than individual processing tasks, enabling each child cluster 502*a-b* to handle an entire data pipeline in a dedicated fashion to maintain isolated processing of different pipelines using different cluster nodes 502*a-b*. Pipeline orchestrator 501 may provide a software API for starting, stopping, submitting, or saving pipelines. When a pipeline is started, pipeline orchestrator 501 may send the pipeline information to an available worker node 502*a-b*, for example using AKKA™ clustering. For each pipeline initialized by pipeline orchestrator 501, a reporting object with status information may be maintained. Streaming activities may report the last time an event was processed, and the number of events processed. Batch activities may report status messages as they occur. Pipeline orchestrator 501 may perform batch caching using, for example, an IGFS™ caching filesystem. This allows activities 512*a-d* within a pipeline 502*a-b* to pass data contexts to one another, with any necessary parameter configurations.

A pipeline manager 511*a-b* may be spawned for every new running pipeline, and may be used to send activity, status, lifecycle, and event count information to the pipeline orchestrator 501. Within a particular pipeline, a plurality of activity actors 512*a-d* may be created by a pipeline manager 511*a-b* to handle individual tasks, and provide output to data services 522*a-d*. Data models used in a given pipeline may be determined by the specific pipeline and activities, as directed by a pipeline manager 511*a-b*. Each pipeline manager 511*a-b* controls and directs the operation of any activity actors 512*a-d* spawned by it. A pipeline process may need to coordinate streaming data between tasks. For this, a pipeline manager 511*a-b* may spawn service connectors to dynamically create TCP connections between activity instances 512*a-d*. Data contexts may be maintained for each individual activity 512*a-d*, and may be cached for provision to other activities 512*a-d* as needed. A data context defines how an activity accesses information, and an activity 512*a-d* may process data or simply forward it to a next step. Forwarding data between pipeline steps may route data through a streaming context or batch context.

A client service cluster 530 may operate a plurality of service actors 521*a-d* to serve the requests of activity actors 512*a-d*, ideally maintaining enough service actors 521*a-d* to support each activity per the service type. These may also be arranged within service clusters 520*a-d*, in a manner similar to the logical organization of activity actors 512*a-d* within clusters 502*a-b* in a data pipeline. A logging service 530 may be used to log and sample DCG requests and messages during operation while notification service 540 may be used to receive alerts and other notifications during operation (for example to alert on errors, which may then be diagnosed by reviewing records from logging service 530), and by being connected externally to messaging system 510, logging and notification services can be added, removed, or modified during operation without impacting DCG 500. A plurality of DCG protocols 550*a-b* may be used to provide structured messaging between a DCG 500 and messaging system 510, or to enable messaging system 510 to distribute DCG messages across service clusters 520*a-d* as shown. A service protocol 560 may be used to define service interactions so that a DCG 500 may be modified without impacting service implementations. In this manner it can be appreciated that the overall structure of a system using an actor-driven DCG 500 operates in a modular fashion, enabling modification and substitution of various components without impacting other operations or requiring additional reconfiguration.

Figure 6:
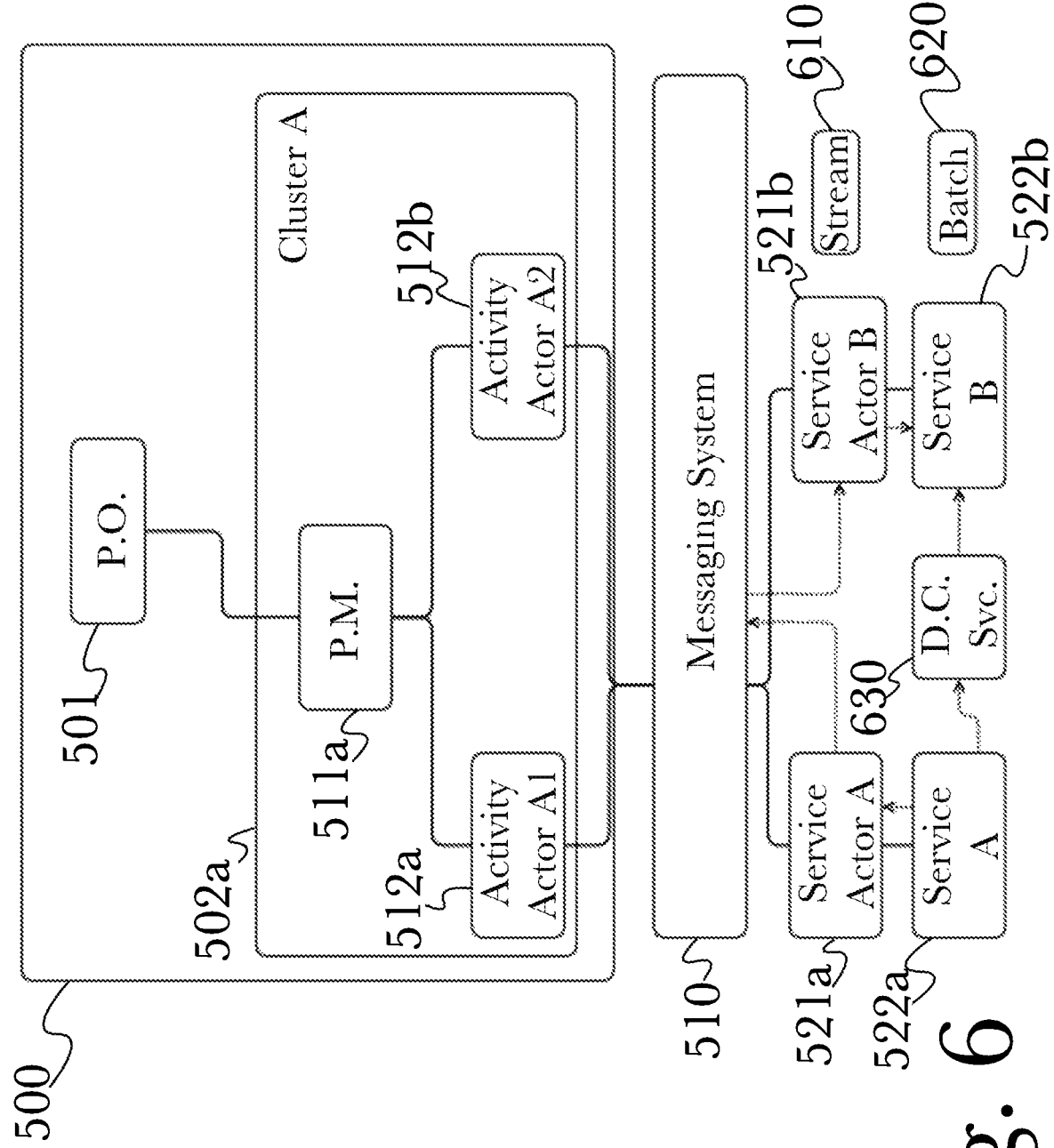
FIG. 6 is a diagram of an exemplary architecture for a system for rapid predictive analysis of very large data sets using an actor-driven distributed computational graph, according to one aspect.

FIG. 6 is a diagram of an exemplary architecture for a system for rapid predictive analysis of very large data sets using an actor-driven distributed computational graph 500, according to one aspect. According to the aspect, a variant messaging arrangement may utilize messaging system 510 as a messaging broker using a streaming protocol 610, transmitting and receiving messages immediately using messaging system 510 as a message broker to bridge communication between service actors 521*a-b* as needed. Alternately, individual services 522*a-b* may communicate directly in a batch context 620, using a data context service 630 as a broker to batch-process and relay messages between services 522*a-b*.

Figure 7:
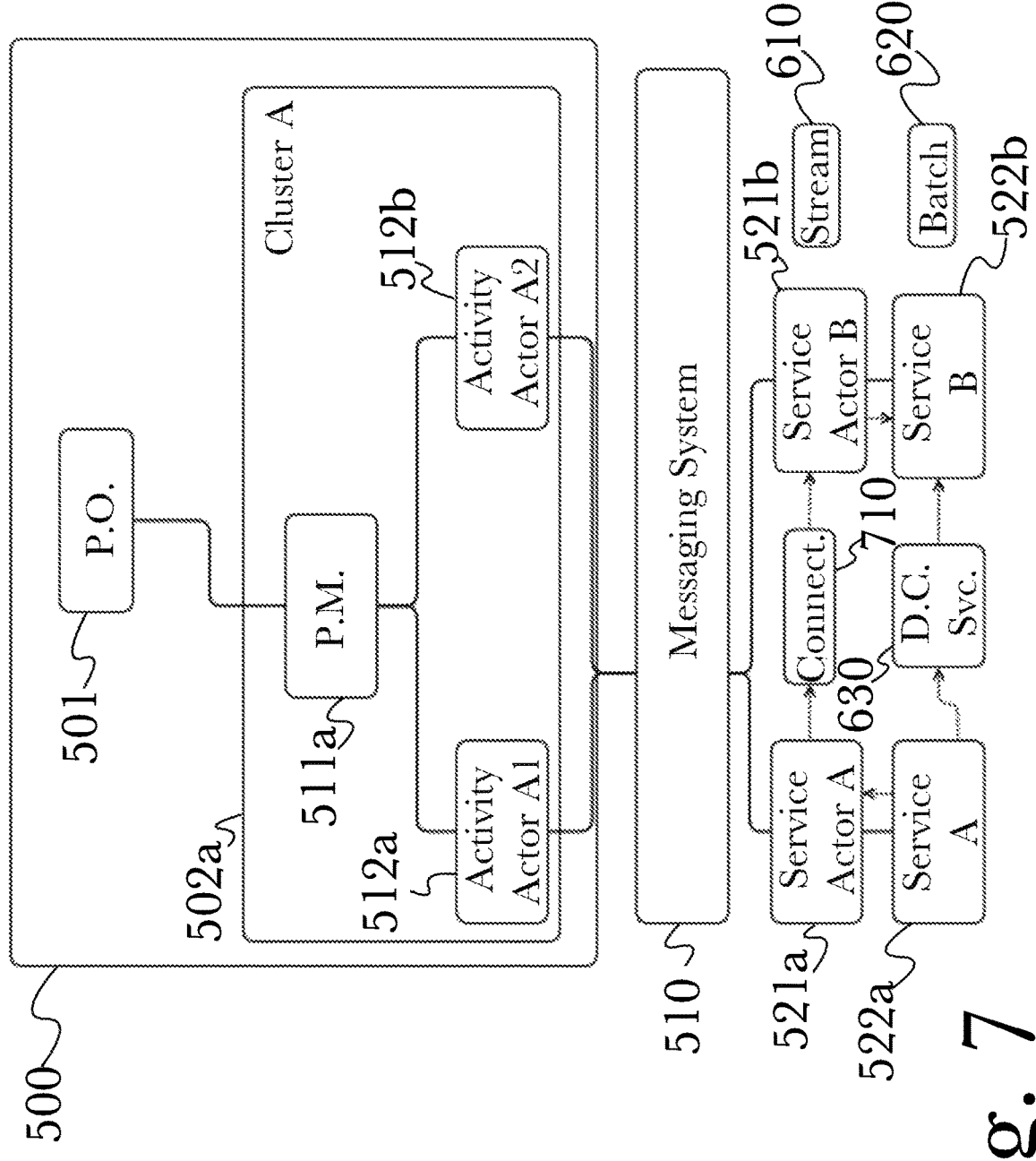
FIG. 7 is a diagram of an exemplary architecture for a system for rapid predictive analysis of very large data sets using an actor-driven distributed computational graph, according to one aspect.

FIG. 7 is a diagram of an exemplary architecture for a system for rapid predictive analysis of very large data sets using an actor-driven distributed computational graph 500, according to one aspect. According to the aspect, a variant messaging arrangement may utilize a service connector 710 as a central message broker between a plurality of service actors 521*a-b*, bridging messages in a streaming context 610 while a data context service 630 continues to provide direct peer-to-peer messaging between individual services 522*a-b* in a batch context 620.

It should be appreciated that various combinations and arrangements of the system variants described above (referring to FIGS. 1-7) may be possible, for example using one particular messaging arrangement for one data pipeline directed by a pipeline manager 511*a-b*, while another pipeline may utilize a different messaging arrangement (or may not utilize messaging at all). In this manner, a single DCG 500 and pipeline orchestrator 501 may operate individual pipelines in the manner that is most suited to their particular needs, with dynamic arrangements being made possible through design modularity as described above in FIG. 5.

Detailed Description of Exemplary Aspects

Figure 8:
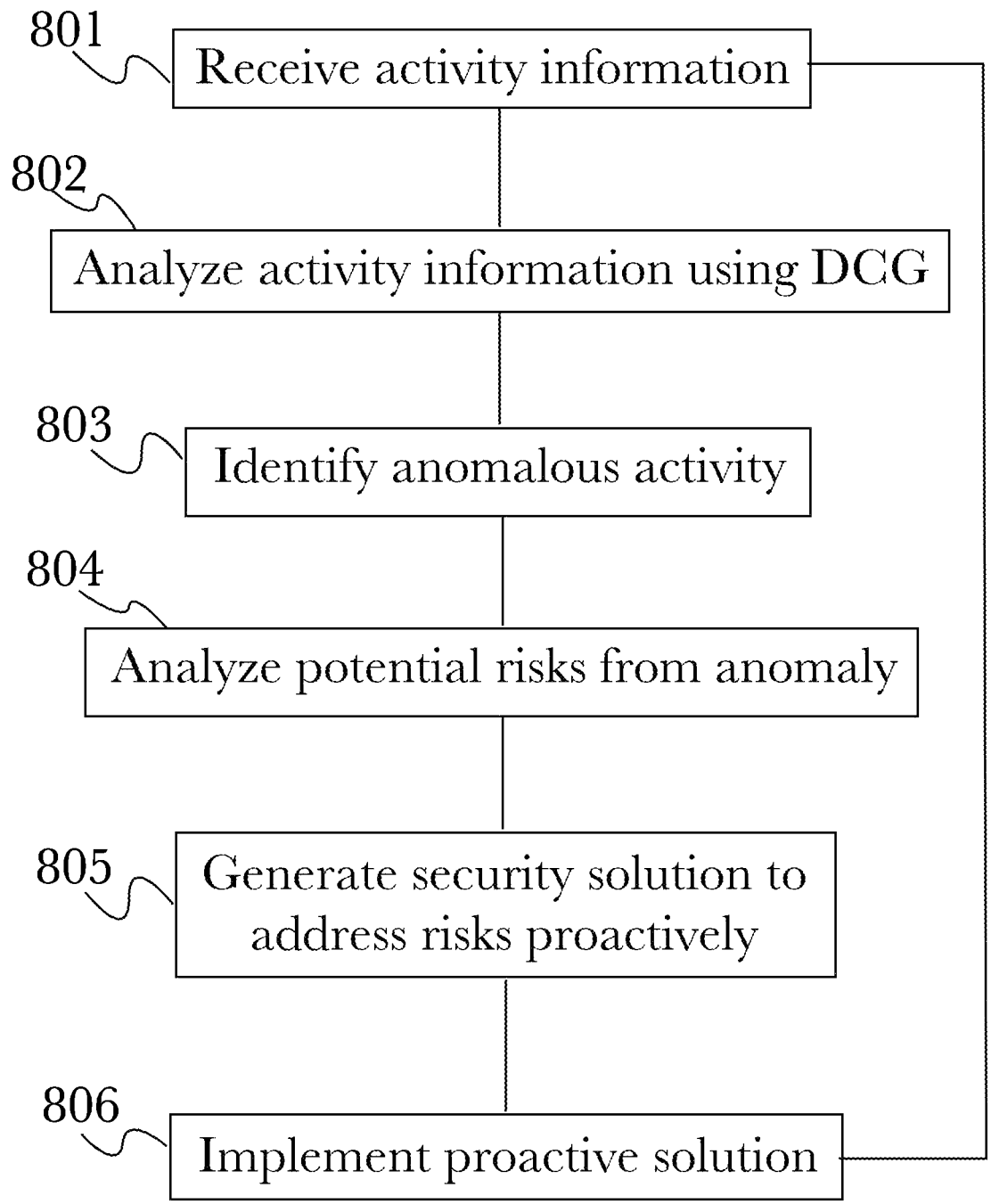
FIG. 8 is a flow diagram of an exemplary method for cybersecurity behavioral analytics, according to one aspect.

FIG. 8 is a flow diagram of an exemplary method 800 for cybersecurity behavioral analytics, according to one aspect. According to the aspect, behavior analytics may utilize passive information feeds from a plurality of existing endpoints (for example, including but not limited to user activity on a network, network performance, or device behavior) to generate security solutions. In an initial step 801, a web crawler 115 may passively collect activity information, which may then be processed 802 using a DCG 155 to analyze behavior patterns. Based on this initial analysis, anomalous behavior may be recognized 803 (for example, based on a threshold of variance from an established pattern or trend) such as high-risk users or malicious software operators such as bots. These anomalous behaviors may then be used 804 to analyze potential angles of attack and then produce 805 security suggestions based on this second-level analysis and predictions generated by an action outcome simulation module 125 to determine the likely effects of the change. The suggested behaviors may then be automatically implemented 806 as needed. Passive monitoring 801 then continues, collecting information after new security solutions are implemented 806, enabling machine learning to improve operation over time as the relationship between security changes and observed behaviors and threats are observed and analyzed.

This method 800 for behavioral analytics enables proactive and high-speed reactive defense capabilities against a variety of cyberattack threats, including anomalous human behaviors as well as nonhuman "bad actors" such as automated software bots that may probe for, and then exploit, existing vulnerabilities. Using automated behavioral learning in this manner provides a much more responsive solution than manual intervention, enabling rapid response to threats to mitigate any potential impact. Utilizing machine learning behavior further enhances this approach, providing additional proactive behavior that is not possible in simple automated approaches that merely react to threats as they occur.

Figure 9:
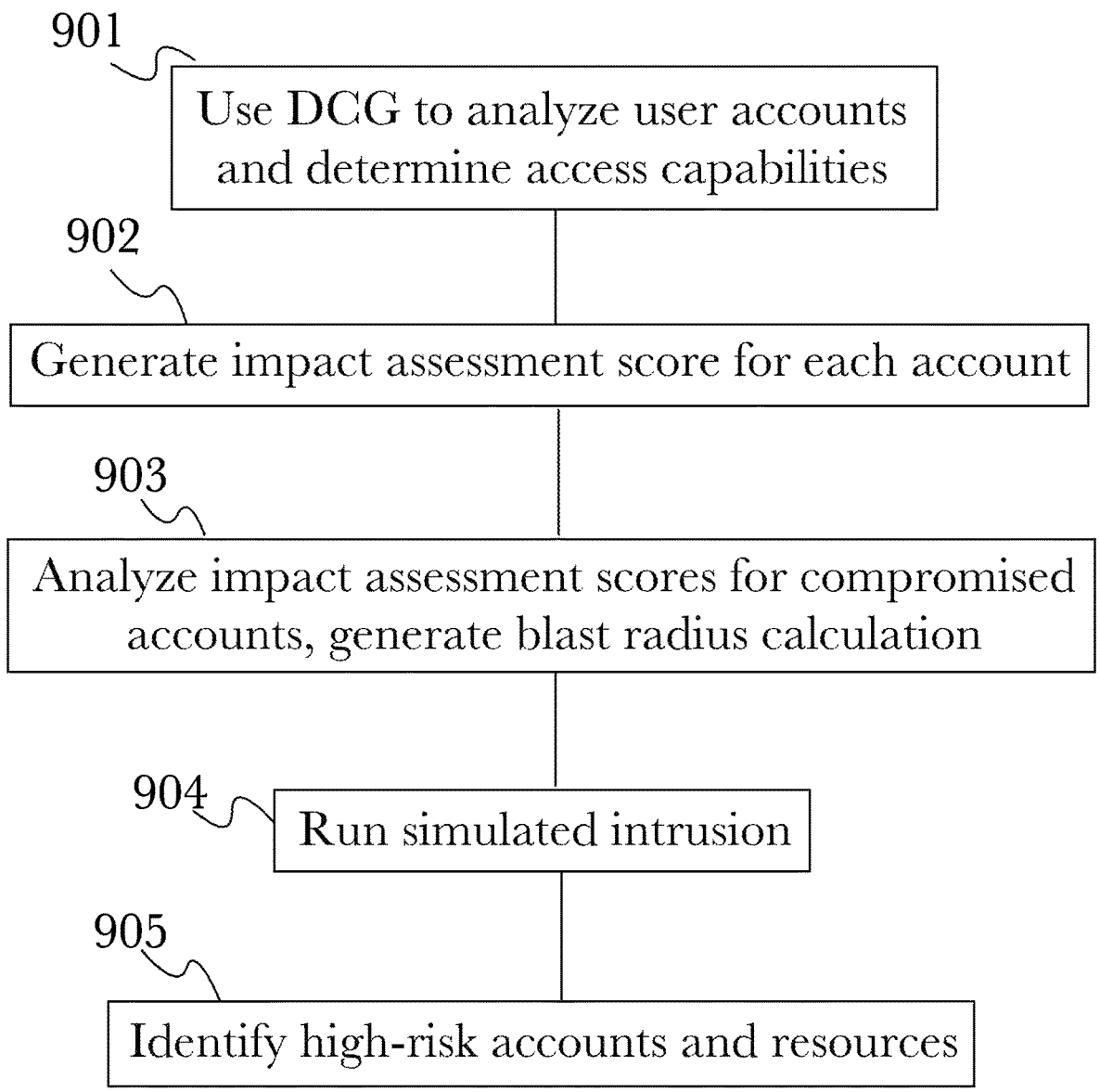
FIG. 9 is a flow diagram of an exemplary method for measuring the effects of cybersecurity attacks, according to one aspect.

FIG. 9 is a flow diagram of an exemplary method 900 for measuring the effects of cybersecurity attacks, according to one aspect. According to the aspect, impact assessment of an attack may be measured using a DCG 155 to analyze a user account and identify its access capabilities 901 (for example, what files, directories, devices or domains an account may have access to). This may then be used to generate 902 an impact assessment score for the account, representing the potential risk should that account be compromised. In the event of an incident, the impact assessment score for any compromised accounts may be used to produce a "blast radius" calculation 903, identifying exactly what resources are at risk as a result of the intrusion and where security personnel should focus their attention. To provide proactive security recommendations through a simulation module 125, simulated intrusions may be run 904 to identify potential blast radius calculations for a variety of attacks and to determine 905 high risk accounts or resources so that security may be improved in those key areas rather than focusing on reactive solutions.

Figure 10:
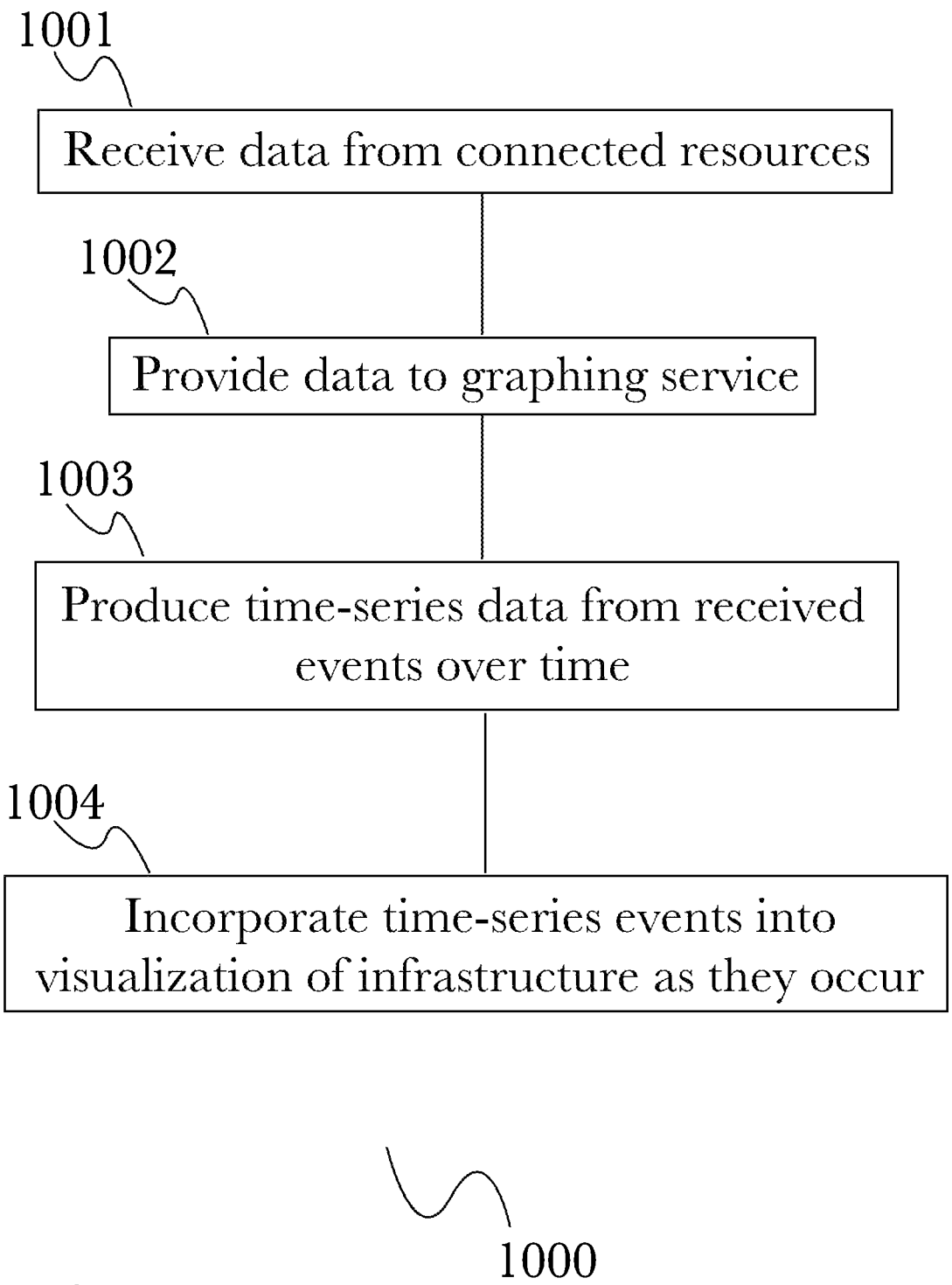
FIG. 10 is a flow diagram of an exemplary method for continuous cybersecurity monitoring and exploration, according to one aspect.

FIG. 10 is a flow diagram of an exemplary method 1000 for continuous cybersecurity monitoring and exploration, according to one aspect. According to the aspect, a state observation service 140 may receive data from a variety of connected systems 1001 such as (for example, including but not limited to) servers, domains, databases, or user directories. This information may be received continuously, passively collecting events and monitoring activity over time while feeding 1002 collected information into a graphing service 145 for use in producing time-series graphs 1003 of states and changes over time. This collated time-series data may then be used to produce a visualization 1004 of changes over time, quantifying collected data into a meaningful and understandable format. As new events are recorded, such as changing user roles or permissions, modifying servers or data structures, or other changes within a security infrastructure, these events are automatically incorporated into the time-series data and visualizations are updated accordingly, providing live monitoring of a wealth of information in a way that highlights meaningful data without losing detail due to the quantity of data points under examination.

Figure 11:
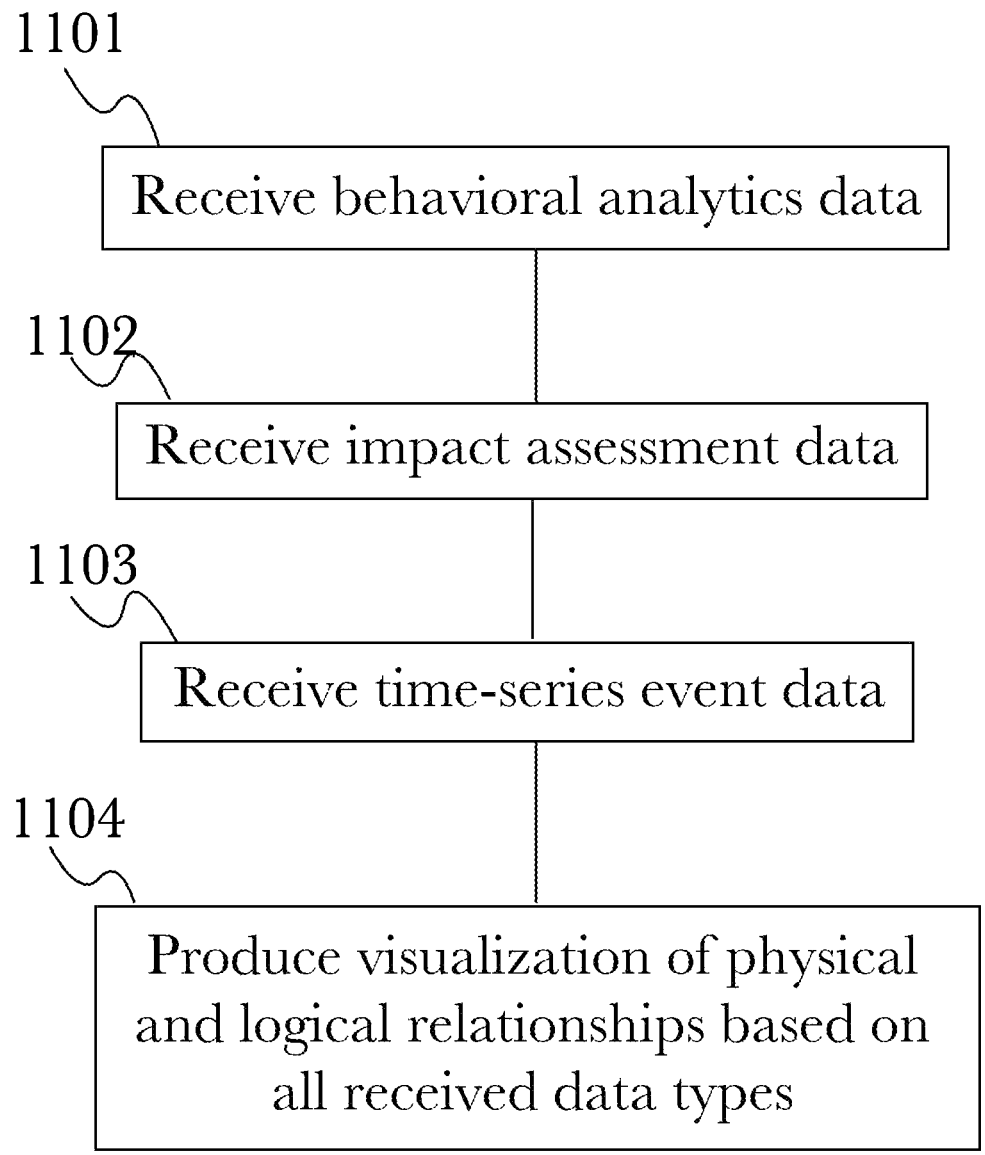
FIG. 11 is a flow diagram of an exemplary method for mapping a cyber-physical system graph, according to one aspect.

FIG. 11 is a flow diagram of an exemplary method 50966 for mapping a cyber-physical system graph (CPG), according to one aspect. According to the aspect, a cyber-physical system graph may comprise a visualization of hierarchies and relationships between devices and resources in a security infrastructure, contextualizing security information with physical device relationships that are easily understandable for security personnel and users. In an initial step 1101, behavior analytics information (as described previously, referring to FIG. 8) may be received at a graphing service 145 for inclusion in a CPG. In a next step 1102, impact assessment scores (as described previously, referring to FIG. 9) may be received and incorporated in the CPG information, adding risk assessment context to the behavior information. In a next step 1103, time-series information (as described previously, referring to FIG. 10) may be received and incorporated, updating CPG information as changes occur and events are logged. This information may then be used to produce 1104 a graph visualization of users, servers, devices, and other resources correlating physical relationships (such as a user's personal computer or smartphone, or physical connections between servers) with logical relationships (such as access privileges or database connections), to produce a meaningful and contextualized visualization of a security infrastructure that reflects the current state of the internal relationships present in the infrastructure.

Figure 12:
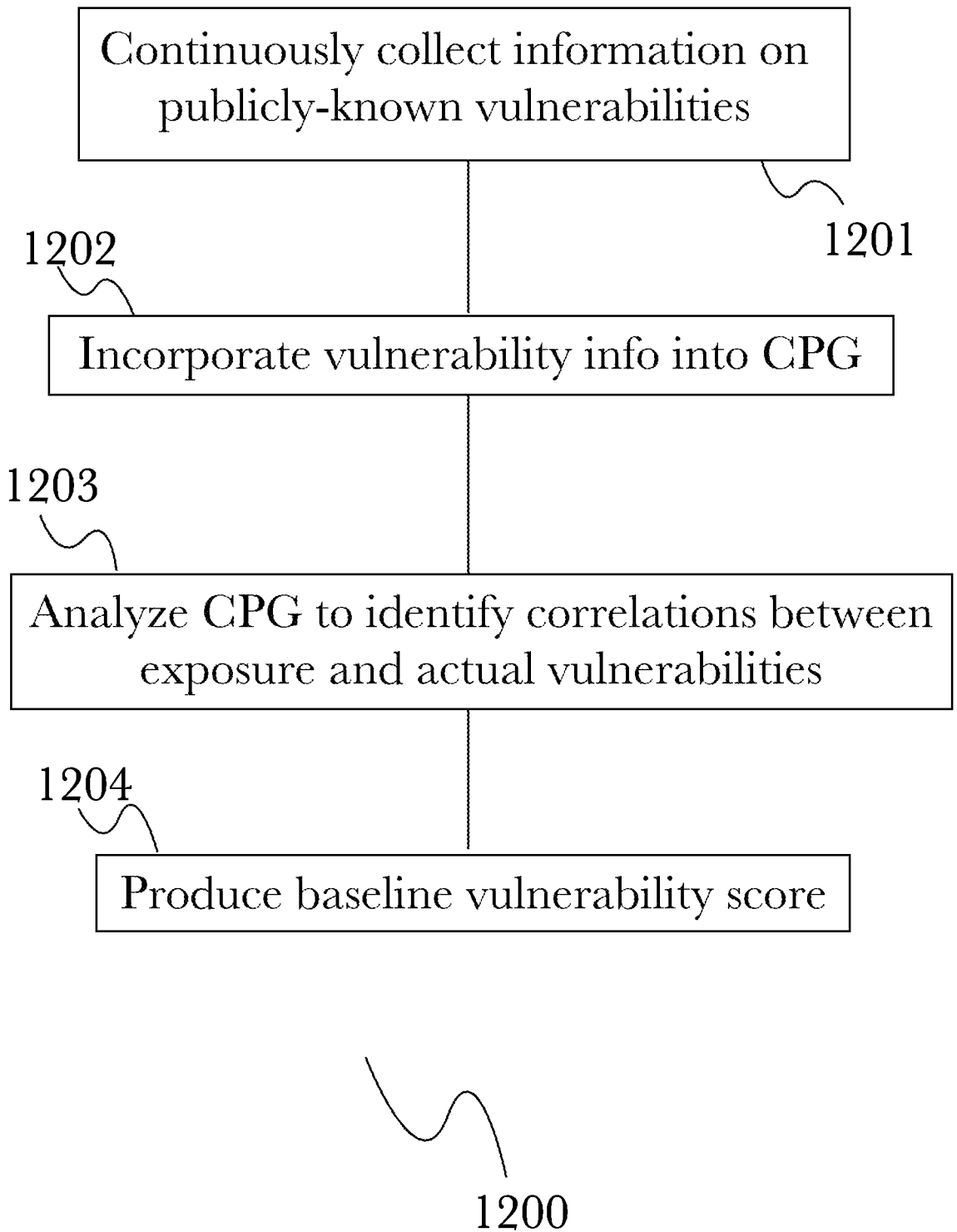
FIG. 12 is a flow diagram of an exemplary method for continuous network resilience scoring, according to one aspect.

FIG. 12 is a flow diagram of an exemplary method 1200 for continuous network resilience scoring, according to one aspect. According to the aspect, a baseline score can be used to measure an overall level of risk for a network infrastructure, and may be compiled by first collecting 1201 information on publicly-disclosed vulnerabilities, such as (for example) using the Internet or common vulnerabilities and exploits (CVE) process. This information may then 1202 be incorporated into a CPG as described previously in FIG. 11, and the combined data of the CPG and the known vulnerabilities may then be analyzed 1203 to identify the relationships between known vulnerabilities and risks exposed by components of the infrastructure. This produces a combined CPG 1204 that incorporates both the internal risk level of network resources, user accounts, and devices as well as the actual risk level based on the analysis of known vulnerabilities and security risks.

Figure 13:
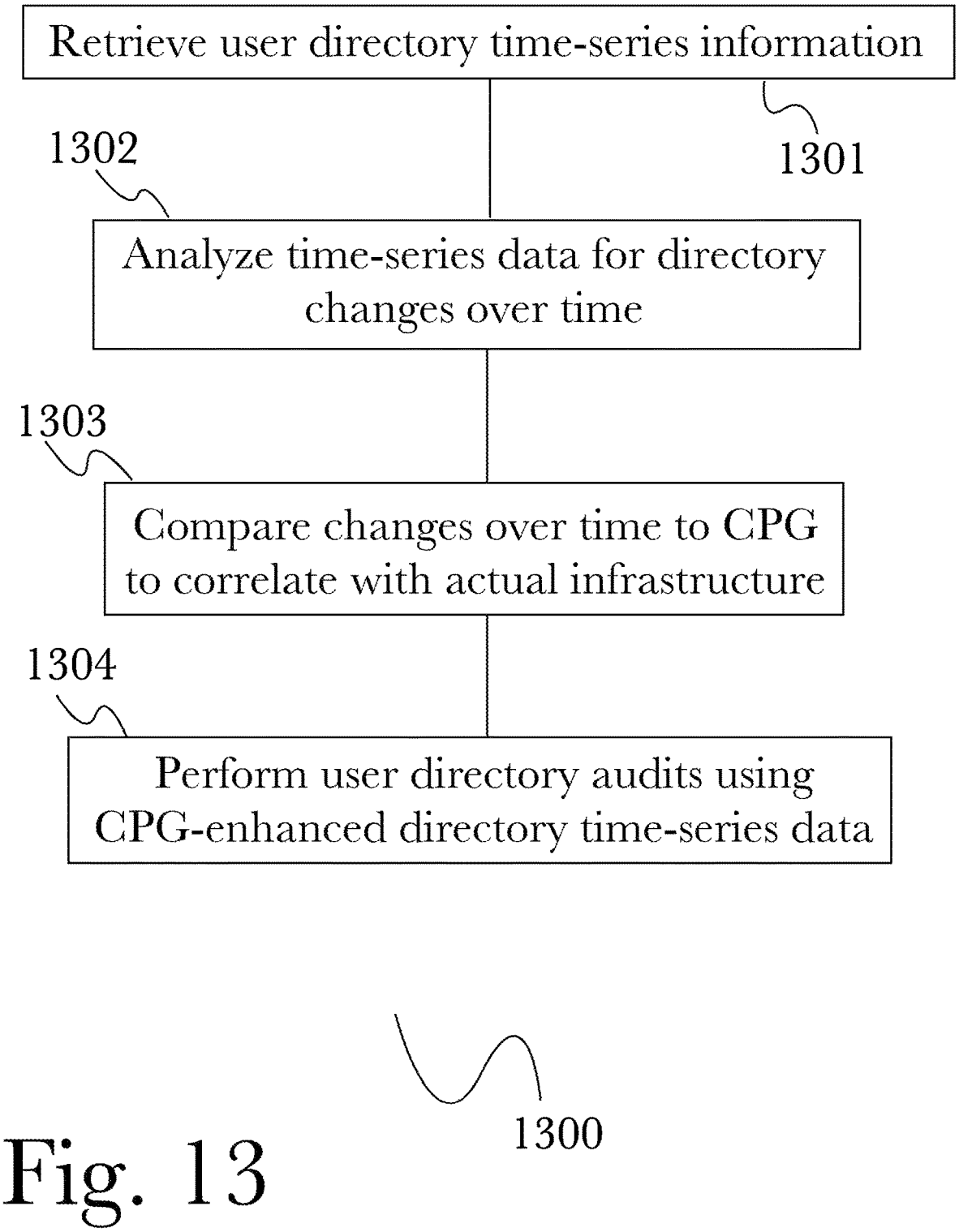
FIG. 13 is a flow diagram of an exemplary method for cybersecurity privilege oversight, according to one aspect.

FIG. 13 is a flow diagram of an exemplary method 1300 for cybersecurity privilege oversight, according to one aspect. According to the aspect, time-series data (as described above, referring to FIG. 10) may be collected 1301 for user accounts, credentials, directories, and other user-based privilege and access information. This data may then 1302 be analyzed to identify changes over time that may affect security, such as modifying user access privileges or adding new users. The results of analysis may be checked 1303 against a CPG (as described previously in FIG. 11), to compare and correlate user directory changes with the actual infrastructure state. This comparison may be used to perform accurate and context-enhanced user directory audits 1304 that identify not only current user credentials and other user-specific information, but changes to this information over time and how the user information relates to the actual infrastructure (for example, credentials that grant access to devices and may therefore implicitly grant additional access due to device relationships that were not immediately apparent from the user directory alone).

Figure 14:
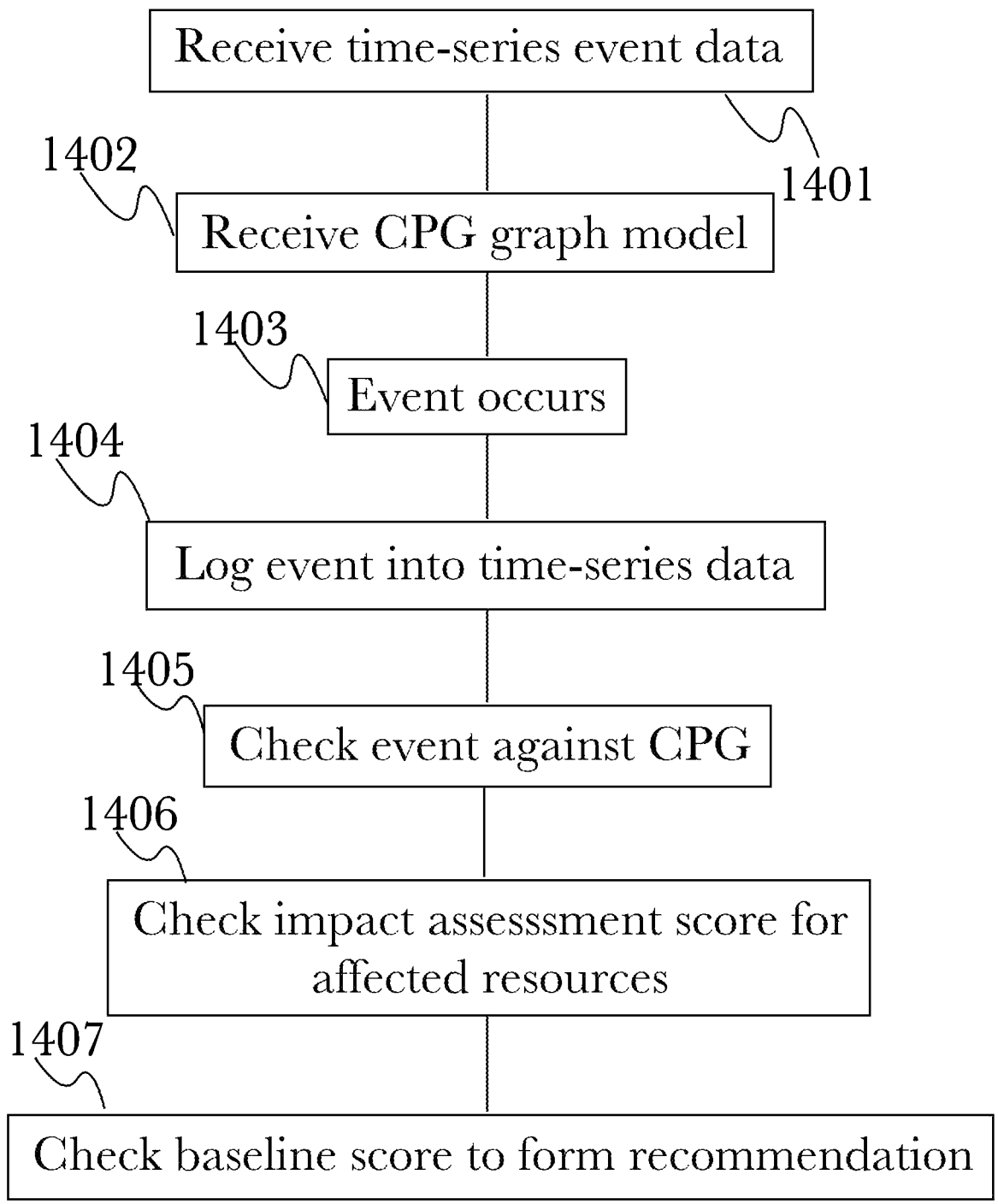
FIG. 14 is a flow diagram of an exemplary method for cybersecurity risk management, according to one aspect.

FIG. 14 is a flow diagram of an exemplary method 1400 for cybersecurity risk management, according to one aspect. According to the aspect, multiple methods described previously may be combined to provide live assessment of attacks as they occur, by first receiving 1401 time-series data for an infrastructure (as described previously, in FIG. 10) to provide live monitoring of network events. This data is then enhanced 1402 with a CPG (as described above in FIG. 11) to correlate events with actual infrastructure elements, such as servers or accounts. When an event (for example, an attempted attack against a vulnerable system or resource) occurs 1403, the event is logged in the time-series data 1404, and compared against the CPG 1405 to determine the impact. This is enhanced with the inclusion of impact assessment information 1406 for any affected resources, and the attack is then checked against a baseline score 1407 to determine the full extent of the impact of the attack and any necessary modifications to the infrastructure or policies.

Figure 15:
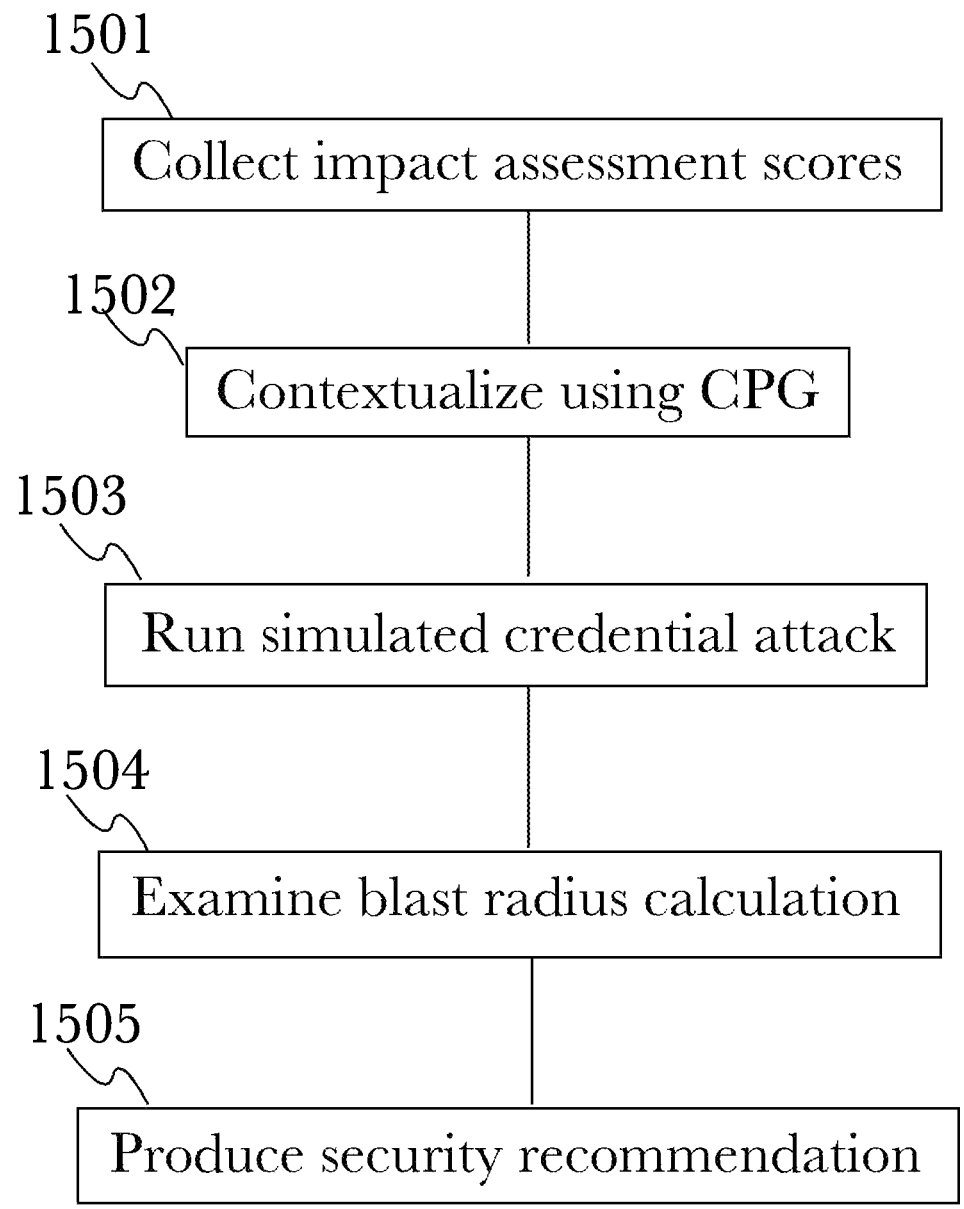
FIG. 15 is a flow diagram of an exemplary method for mitigating compromised credential threats, according to one aspect.

FIG. 15 is a flow diagram of an exemplary method 1500 for mitigating compromised credential threats, according to one aspect. According to the aspect, impact assessment scores (as described previously, referring to FIG. 9) may be collected 1501 for user accounts in a directory, so that the potential impact of any given credential attack is known in advance of an actual attack event. This information may be combined with a CPG 1502 as described previously in FIG. 11, to contextualize impact assessment scores within the infrastructure (for example, so that it may be predicted what systems or resources might be at risk for any given credential attack). A simulated attack may then be performed 1503 to use machine learning to improve security without waiting for actual attacks to trigger a reactive response. A blast radius assessment (as described above in FIG. 9) may be used in response 1504 to determine the effects of the simulated attack and identify points of weakness, and produce a recommendation report 1505 for improving and hardening the infrastructure against future attacks.

Figure 16:
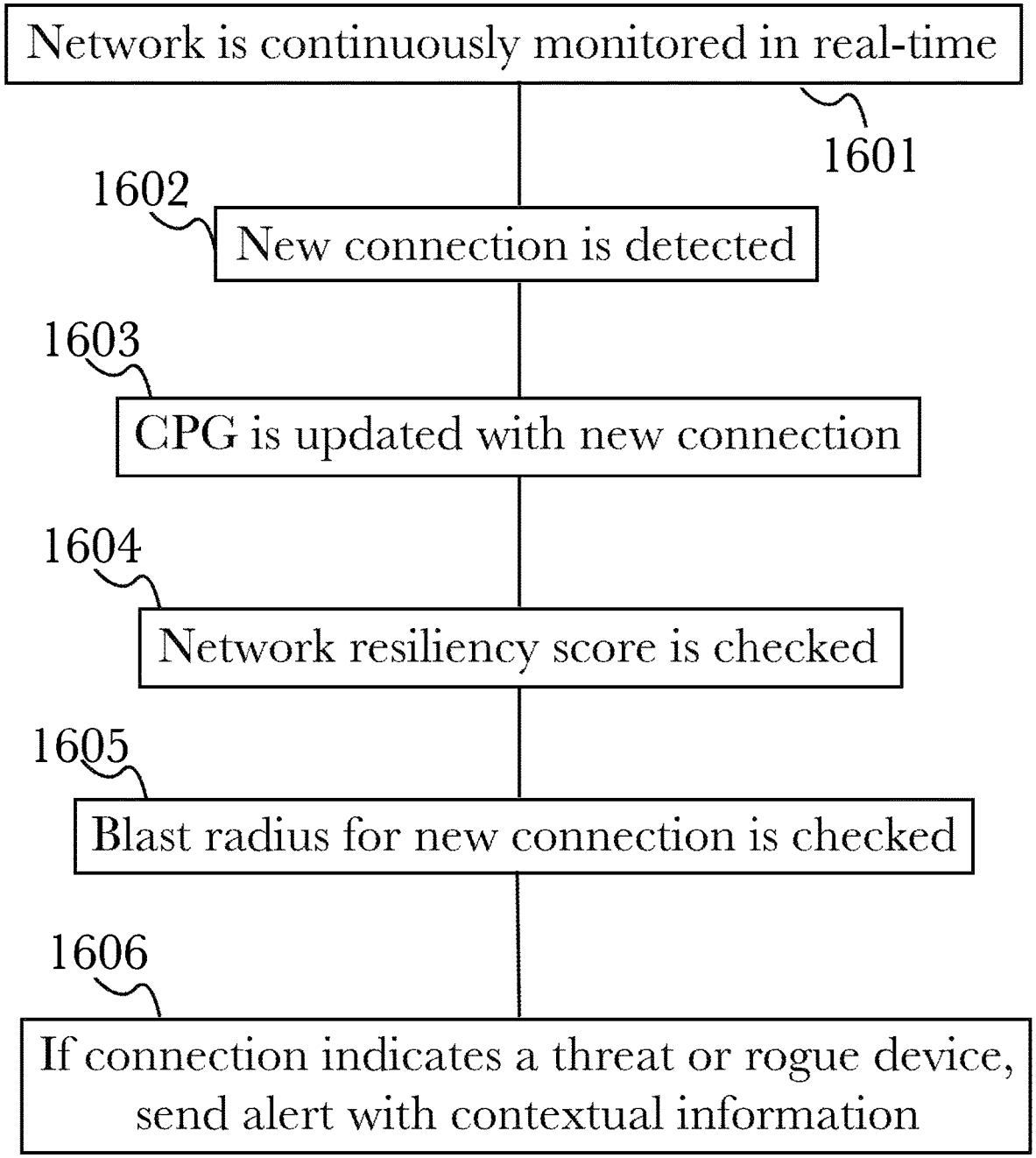
FIG. 16 is a flow diagram of an exemplary method for dynamic network and rogue device discovery, according to one aspect.

FIG. 16 is a flow diagram of an exemplary method 1600 for dynamic network and rogue device discovery, according to one aspect. According to the aspect, an advanced cyber decision platform may continuously monitor a network in real-time 1601, detecting any changes as they occur. When a new connection is detected 1602, a CPG may be updated 1603 with the new connection information, which may then be compared against the network's resiliency score 1604 to examine for potential risk. The blast radius metric for any other devices involved in the connection may also be checked 1605, to examine the context of the connection for risk potential (for example, an unknown connection to an internal data server with sensitive information may be considered a much higher risk than an unknown connection to an externally-facing web server). If the connection is a risk, an alert may be sent to an administrator 1606 with the contextual information for the connection to provide a concise notification of relevant details for quick handling.

Figure 17:
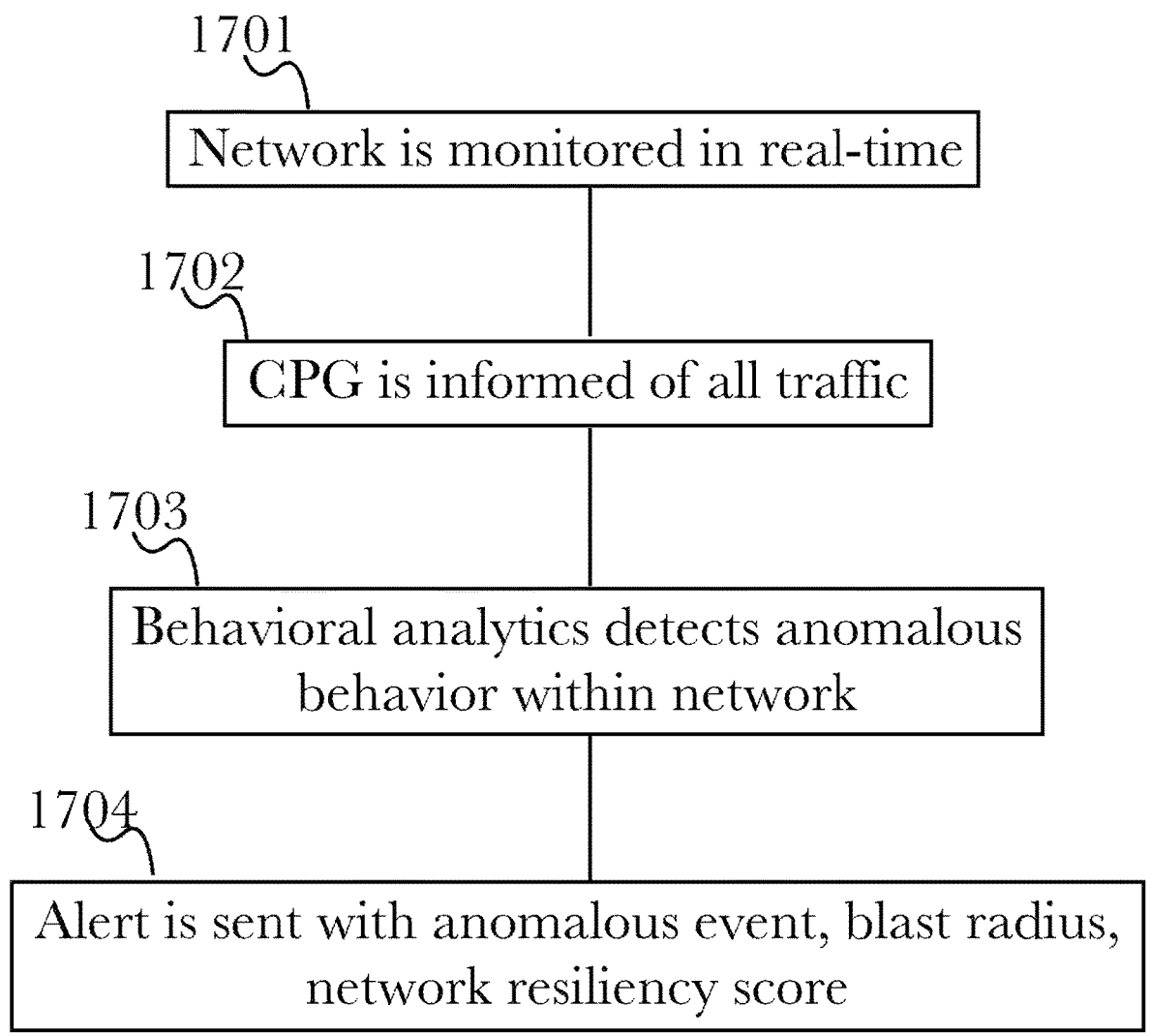
FIG. 17 is a flow diagram of an exemplary method for Kerberos "golden ticket" attack detection, according to one aspect.

FIG. 17 is a flow diagram of an exemplary method 1700 for Kerberos "golden ticket" attack detection, according to one aspect. Kerberos is a network authentication protocol employed across many enterprise networks to enable single sign-on and authentication for enterprise services. This makes it an attractive target for attacks, which can result in persistent, undetected access to services within a network in what is known as a "golden ticket" attack. To detect this form of attack, behavioral analytics may be employed to detect forged authentication tickets resulting from an attack. According to the aspect, an advanced cyber decision platform may continuously monitor a network 1701, informing a CPG in real-time of all traffic associated with people, places, devices, or services 1702. Machine learning algorithms detect behavioral anomalies as they occur in real-time 1703, notifying administrators with an assessment of the anomalous event 1704 as well as a blast radius score for the particular event and a network resiliency score to advise of the overall health of the network. By automatically detecting unusual behavior and informing an administrator of the anomaly along with contextual information for the event and network, a compromised ticket is immediately detected when a new authentication connection is made.

Figure 18:
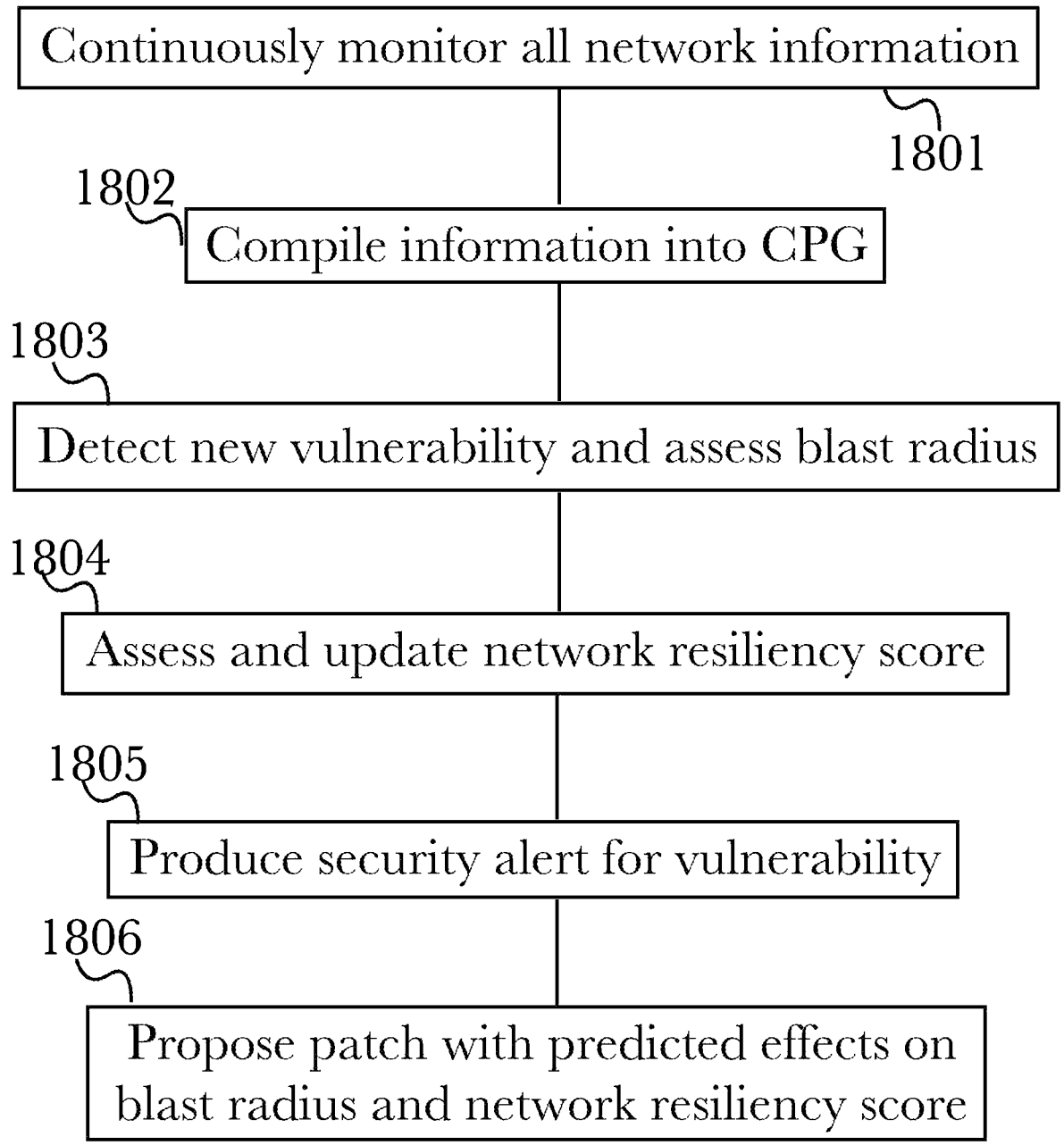
FIG. 18 is a flow diagram of an exemplary method for risk-based vulnerability and patch management, according to one aspect.

FIG. 18 is a flow diagram of an exemplary method 1800 for risk-based vulnerability and patch management, according to one aspect. According to the aspect, an advanced cyber decision platform may monitor all information about a network 1801, including (but not limited to) device telemetry data, log files, connections and network events, deployed software versions, or contextual user activity information. This information is incorporated into a CPG 1802 to maintain an up-to-date model of the network in real-time. When a new vulnerability is discovered, a blast radius score may be assessed 1803 and the network's resiliency score may be updated 1804 as needed. A security alert may then be produced 1805 to notify an administrator of the vulnerability and its impact, and a proposed patch may be presented 1806 along with the predicted effects of the patch on the vulnerability's blast radius and the overall network resiliency score. This determines both the total impact risk of any particular vulnerability, as well as the overall effect of each vulnerability on the network as a whole. This continuous network assessment may be used to collect information about new vulnerabilities and exploits to provide proactive solutions with clear result predictions, before attacks occur.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 19:
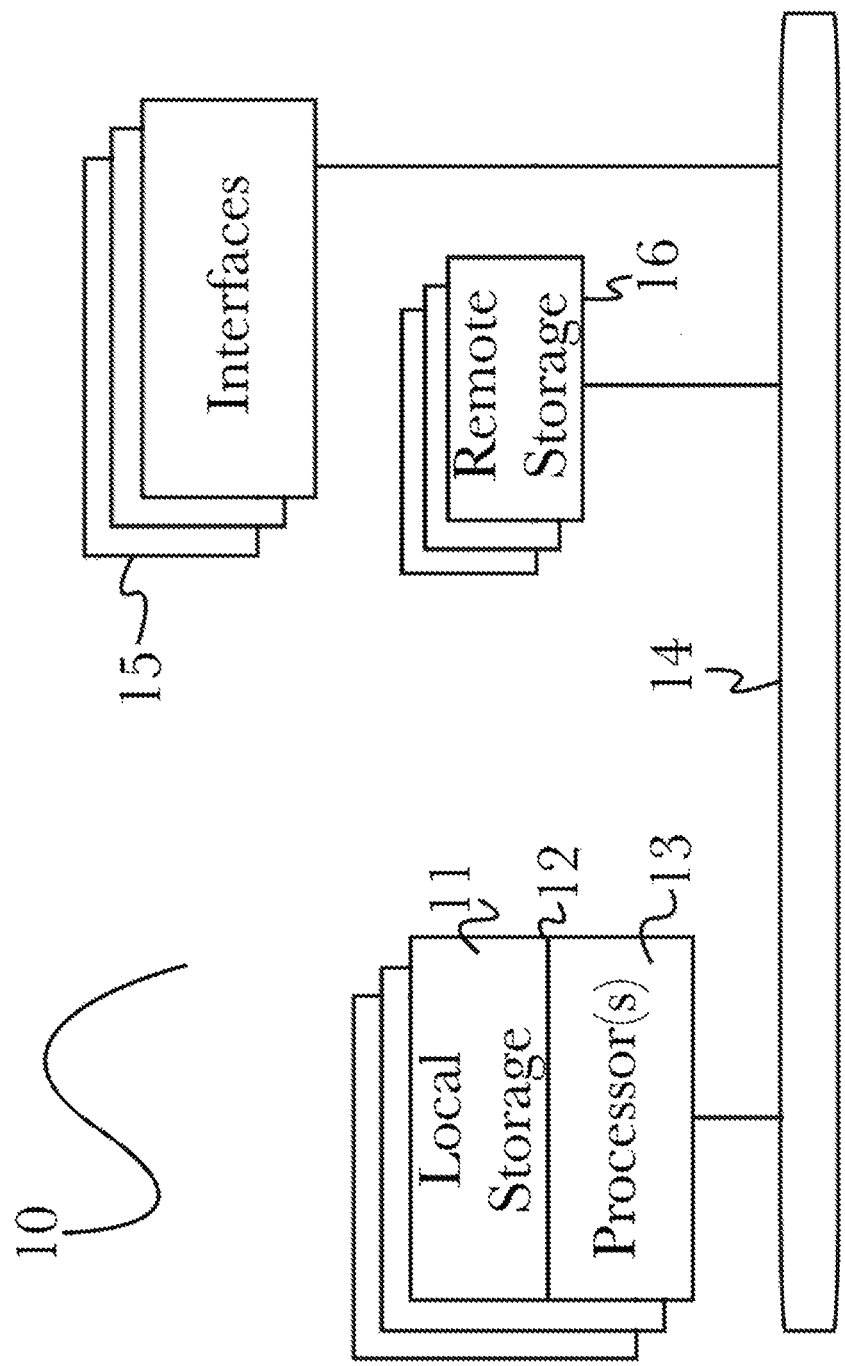
FIG. 19 is a block diagram illustrating an exemplary hardware architecture of a computing device.

Referring now to FIG. 19, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 19 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 20:
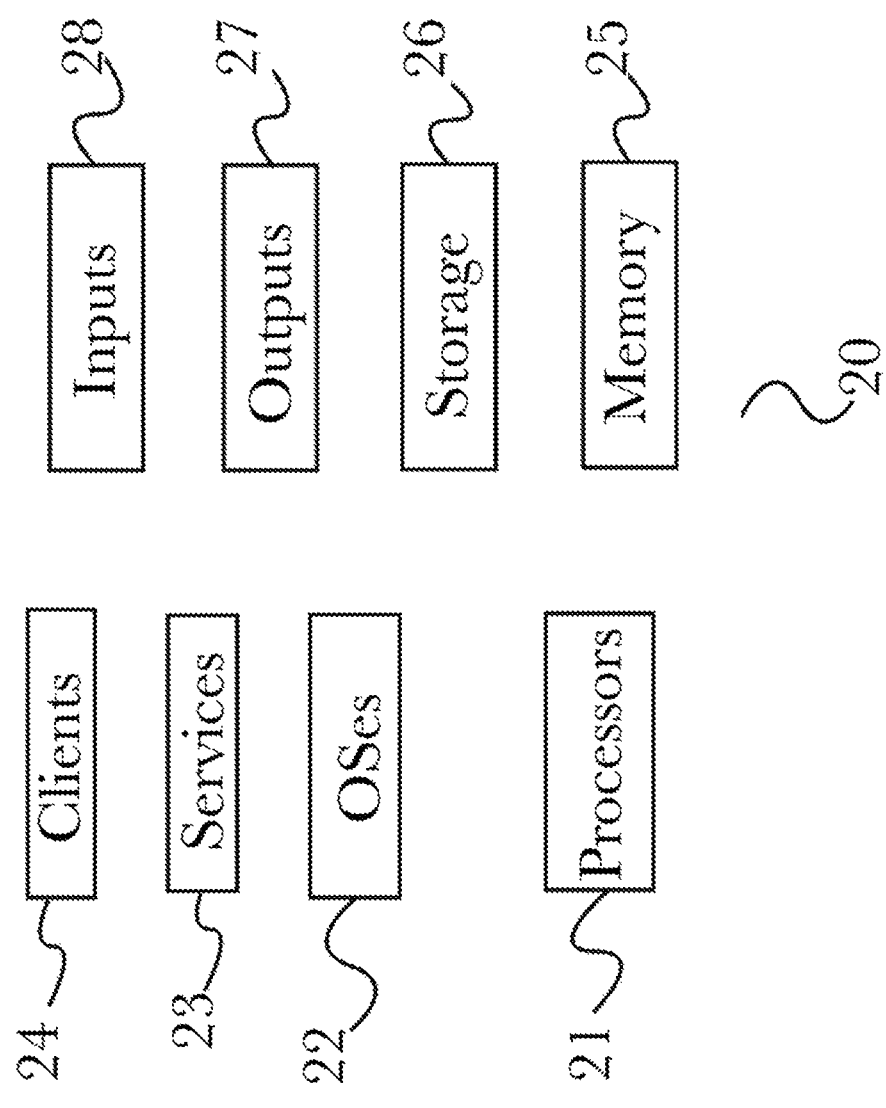
FIG. 20 is a block diagram illustrating an exemplary logical architecture for a client device.

In some aspects, systems may be implemented on a standalone computing system. Referring now to FIG. 20, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 19). Examples of storage devices 26 include flash memory, magnetic hard drive, CD-ROM, and/or the like.

Figure 21:
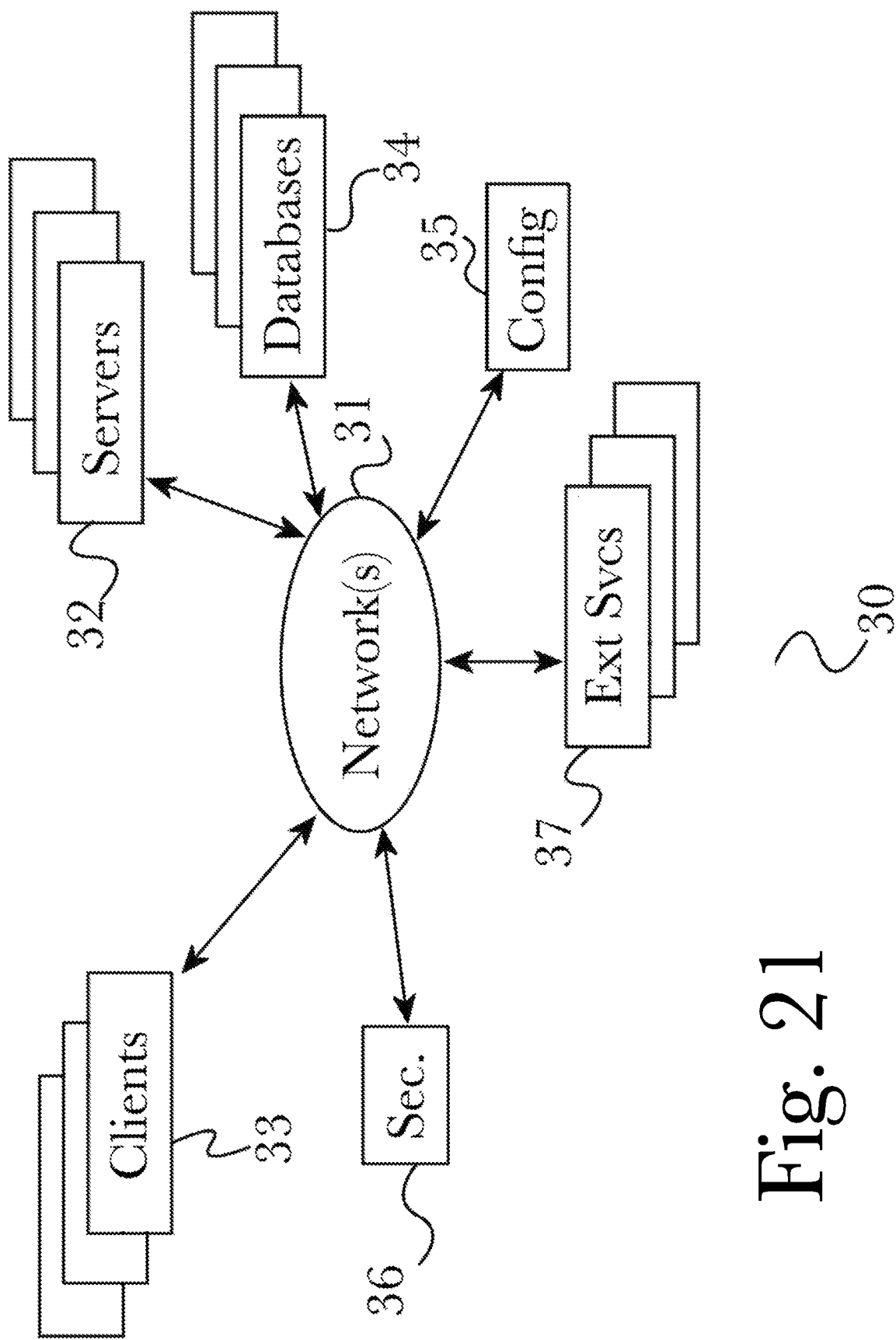
FIG. 21 is a block diagram illustrating an exemplary architectural arrangement of clients, servers, and external services.

In some aspects, systems may be implemented on a distributed computing network, such as one having any number of clients and/or servers. Referring now to FIG. 21, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 20. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system.

Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 22:
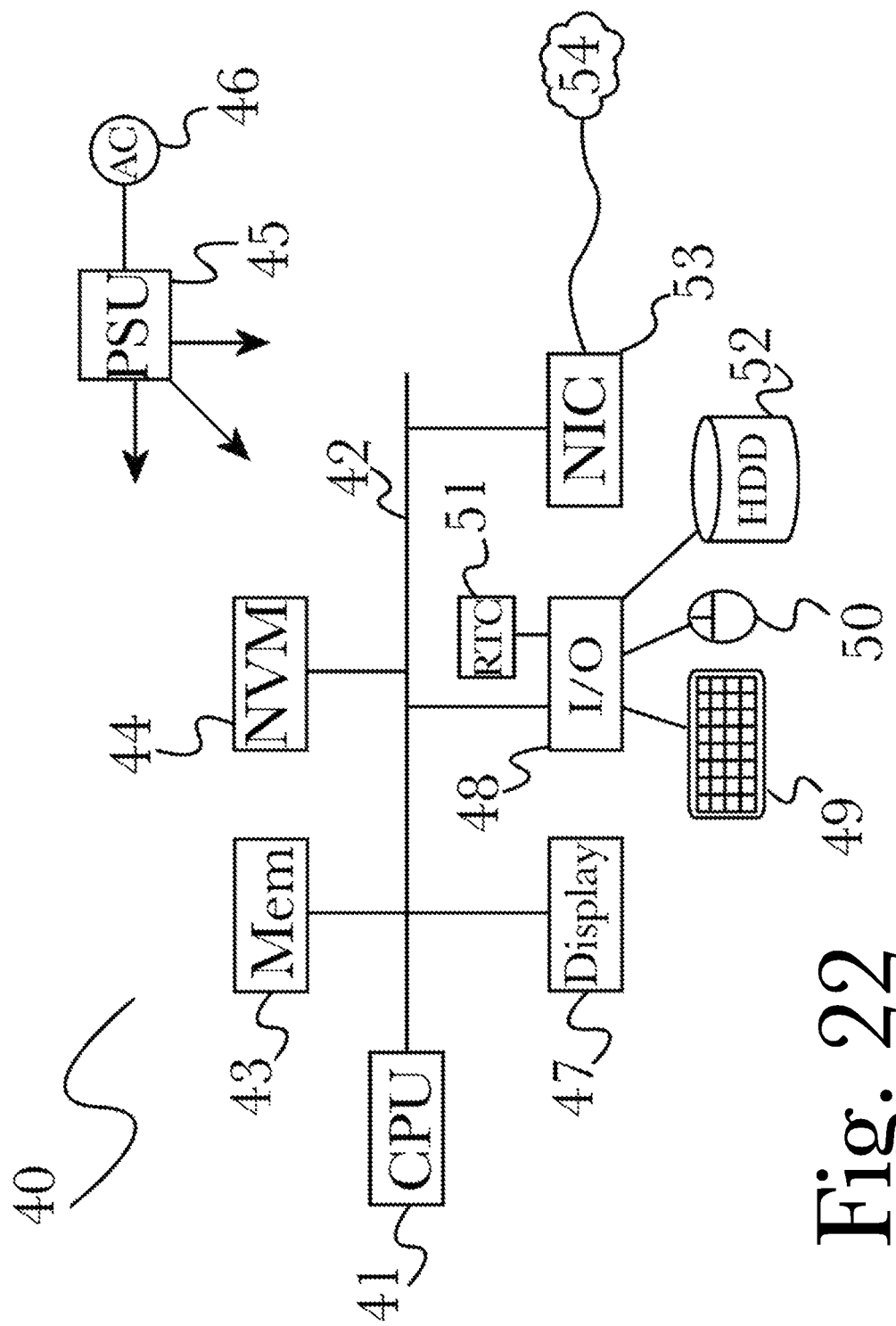
FIG. 22 is another block diagram illustrating an exemplary hardware architecture of a computing device.

FIG. 22 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. An advanced cyber decision platform for external network reconnaissance and cybersecurity rating, the platform comprising:
    a computing device comprising a memory and a processor;
    a time-series data module comprising a first plurality of programming instructions stored in the memory of, and operating on the processor of, the computing device, wherein the first plurality of programming instructions, when operating on the processor, cause the computing device to:
        receive leak information and reconnaissance data about a company from a web crawler; and
        produce time-series data based on at least a portion of the leak information and reconnaissance data;
    a directed computational graph module comprising a second plurality of programming instructions stored in the memory of, and operating on the processor of, the computing device, wherein the second plurality of programming instructions, when operating on the processor, cause the computing device to:
        retrieve at least a portion of the stored time series data;
        produce a directed computational graph by performing a plurality of transformation operations on at least a portion of the time-series data, wherein:
            each transformation operation sends a message output to subsequent transformation operations;
            the directed computational graph comprises nodes and edges, the nodes representing the transformation operations and the edges representing message outputs between the nodes; and
            one or more of the transformation operations are linearization of non-linear operations that are created when they are ready to be computed; and
        produce a weighted score based on at least a portion of the transformation operations, wherein the weighted score represents a risk of external cyber-security threats to the company based on the collected leak information and the reconnaissance data; and
    a web crawler comprising at least a processor, a memory, and a plurality of programming instructions stored in the memory and operating on the processor, wherein the programmable instructions, when operating on the processor, cause the processor to:
        collect leak information about a company from publicly-available records using domain name system entries and internet protocol addresses associated with the company;
        use the collected leak information to obtain reconnaissance data for websites and Internet applications used by, or affecting, the company, the reconnaissance data comprising:
            identifying portions each website or application that web crawlers are requested to ignore;
            fingerprinting each website or application to identify characteristic patterns or markers that may be used to identify host or application details;
            checking each website's administrative pages to determine if any administrative portals are vulnerable to cyber-attacks; and
            determining a patching frequency of each website or application; and
        provide the collected leak information and the reconnaissance data to the time-series data module.

2. A method for external network reconnaissance and cybersecurity rating, comprising the steps of:
    Using a web crawler to:
        collect leak information about a company from publicly-available records using domain name system entries and internet protocol addresses associated with the company;
        use the collected leak information to obtain reconnaissance data for websites and Internet applications used by, or affecting, the company, the reconnaissance data comprising:

identifying portions each website or application that web crawlers are requested to ignore;

fingerprinting each website or application to identify characteristic patterns or markers that may be used to identify host or application details;

checking each website's administrative pages to determine if any administrative portals are vulnerable to cyber-attacks; and determining a patching frequency of each website or application; and producing, using a time-series data module, time-series data based on at least a portion of the leak information and the reconnaissance data;

producing a directed computational graph by performing, using a directed computational graph module, a plurality of transformation operations on at least a portion of the time-series data, wherein:

each transformation operation sends a message output to subsequent transformation operations;

the directed computational graph comprises nodes and edges, the nodes representing the transformation operations and the edges representing message outputs between the nodes; and one or more of the transformation operations are linearization of non-linear operations that are created when they are ready to be computed; and producing a weighted score based on at least a portion of the transformation operations, wherein the weighted score represents a risk of external cyber-security threats to the company based on the collected leak information and the reconnaissance data.

\* \* \* \* \*